(12) United States Patent
Motamedi et al.

(10) Patent No.: US 6,900,896 B2
(45) Date of Patent: May 31, 2005

(54) METHOD AND SYSTEM FOR MEASURING OPTICAL CHARACTERISTICS OF A SUB-COMPONENT WITHIN A COMPOSITE OPTICAL SYSTEM

(75) Inventors: Ali Motamedi, Los Altos, CA (US); Bogdan Szafraniec, Sunnyvale, CA (US); Gregory D. VanWiggeren, Los Gatos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 377 days.

(21) Appl. No.: 10/098,702

(22) Filed: Mar. 15, 2002

(65) Prior Publication Data

US 2003/0053069 A1 Mar. 20, 2003

Related U.S. Application Data

(63) Continuation-in-part of application No. 09/938,100, filed on Aug. 22, 2001.

(51) Int. Cl.[7] ............................ G01B 9/02; G01B 11/02; G01N 21/00

(52) U.S. Cl. ....................... 356/477; 356/484; 356/512; 356/513; 356/73.1

(58) Field of Search ................................ 356/477, 484, 356/512, 513, 73.1

(56) References Cited

U.S. PATENT DOCUMENTS

| | | | | |
|---|---|---|---|---|
| 4,921,347 A | * | 5/1990 | Wong et al. | 356/73.1 |
| 5,062,703 A | * | 11/1991 | Wong et al. | 356/73.1 |
| 5,293,213 A | * | 3/1994 | Klein et al. | 356/484 |
| 6,359,692 B1 | * | 3/2002 | Groot | 356/512 |
| 6,456,382 B2 | * | 9/2002 | Ichihara et al. | 356/513 |

* cited by examiner

Primary Examiner—Gregory J. Toatley, Jr.
Assistant Examiner—Khaled Brown

(57) ABSTRACT

A method and system for measuring optical characteristics of a sub-component within a composite optical system is disclosed. In one embodiment, the present invention generates an optical response from a composite optical system. The present embodiment then separates an optical response of a sub-component from the optical response of the composite optical system. The present embodiment then determines the optical characteristics of the sub-component by utilizing at least one portion of the optical response of the sub-component.

20 Claims, 14 Drawing Sheets

Time domain:

Frequency domain:

Composite Optical System

Sub-Component Only

METHOD AND SYSTEM FOR MEASURING OPTICAL CHARACTERISTICS OF A SUB-COMPONENT WITHIN A COMPOSITE OPTICAL SYSTEM

RELATED APPLICATION

This application is a Continuation-in-Part of commonly-owned, co-pending U.S. patent application entitled "Interferometric Optical Component Analyzer Based on Orthogonal Filters", by Szafraniec et al. filed Aug. 22, 2001 and having U.S. Ser. No. 09/938,100 which incorporated herein by reference.

TECHNICAL FIELD

The present claimed invention relates to the field of optical network analysis. More specifically, the present claimed invention relates to determining the optical characteristics of an optical component.

BACKGROUND ART

Optical network analysis is frequently used to determine optical characteristics of a composite optical system. For example, the optical characteristics of a series of fiber Bragg gratings can be determined using an optical network analyzer. Although such an approach provides information about the optical characteristics of the composite optical system, such conventional approaches do not provide significant information about the individual sub-components which comprise the composite optical system. That is, while a conventional approach may measure, for example, the cumulative optical characteristics of a series of fiber Bragg gratings, conventional approaches do not readily provide the optical characteristics of each or any individual fiber Bragg grating within the composite system. Although a composite optical system having multiple fiber Bragg gratings is mentioned above, the inability to readily determine the optical characteristics of a particular sub-component is relevant to numerous other types of composite optical systems and various other types of devices under test (DUTs).

One approach to determining the optical characteristics of a sub-component of a composite optical system is to dismantle the composite optical system and analyze the desired sub-component by itself. While such an approach may enable distinctly determining the optical characteristics of the removed sub-component, dismantling a composite optical system can be extremely complicated and time-consuming resulting in damage to the ultimately re-assembled composite optical system. Hence, dismantling of a composite optical system is not a viable or desired approach for measuring the optical characteristics of a sub-component within a composite optical system.

In some instances, the manufacturer of the composite optical system may provide specifications reciting various optical characteristics of the composite optical system and perhaps the sub-components thereof. Unfortunately, such specifications may not include the optical characteristics of interest. Moreover, in some instances, even if the optical characteristics of interest are recited for the sub-component, the manufacturer provided specifications may be inaccurate. Hence, it is not always possible to rely upon manufacturer provided specifications to ascertain the optical characteristics of a sub-component within a composite optical system.

As yet another consideration, advancements have been made in optical network analysis which enable extremely accurate determination of the optical characteristics of a composite optical system. As an example, interferometric methods employing continuously tunable laser sources can now be used to examine and measure the optical characteristics of a composite optical system. Such systems, however, provide analysis of the entire composite optical system and not an individual sub-component thereof.

Thus, a need exists for a method and system to readily determine the optical characteristics of a sub-component of a composite optical system. A further need exists for a method and system which meets the above need and which does not require dismantling of the composite optical system. Another need exists for a method and system which meets the above needs and which can be used to verify or correct manufacturer specified optical characteristics for a sub-component within a composite optical system. Yet another need exists for a method and system which meets the above needs and which is compatible with interferometric optical component analyzers employing continuously sweeping light sources.

DISCLOSURE OF THE INVENTION

The present invention provides a method and system to readily determine the optical characteristics of a sub-component of a composite optical system. The present invention further provides for a method and system which achieves the above accomplishment and which does not require dismantling of the composite optical system. The present invention also provides a method and system which achieves the above accomplishments and which can be used to verify or correct manufacturer specified optical characteristics for a sub-component within a composite optical system. The present invention further provides a method and system which achieves the above accomplishments and which is compatible with interferometric optical component analyzers employing continuously sweeping light sources.

Specifically, in one embodiment, the present invention generates an optical response from a composite optical system. The present embodiment then separates an optical response of a sub-component from the optical response of the composite optical system. The present embodiment then determines the optical characteristics of the sub-component by utilizing at least one portion of the optical response of the sub-component.

These and other technical features of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 16B depicts a Hilbert transform in accordance with one embodiment of the present invention.

Figure 1:
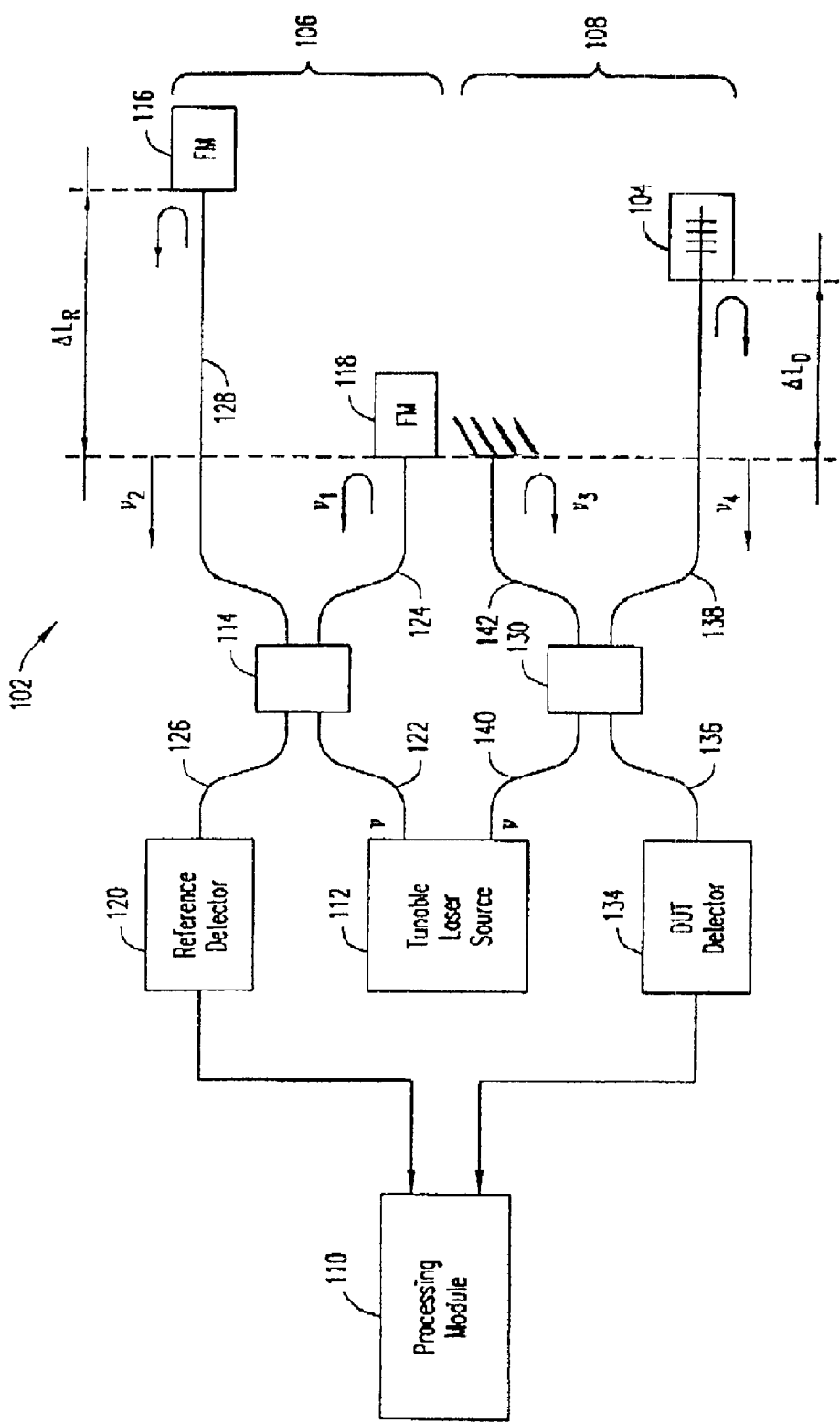
FIG. 1 is a block diagram of an optical network analyzer configured to perform reflectance measurement in accordance with the principles of embodiments of the present invention.

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present invention.

The following discussion will begin with a detailed description of an interferometric optical analysis system and method. This discussion will then be followed by a detailed description of a method and system for measuring optical characteristics of a sub-component of a composite optical system. In various embodiments of the present invention, the method and system for measuring optical characteristics of a sub-component of a composite optical system will employ the above-mentioned interferometric optical analysis system and method.

Interferometric Optical Analysis System and Method

Tunable laser sources as presently available frequency sweep in a non-uniform manner. A heterodyne beat signal having a beat frequency produced by an interferometer for measuring optical components is affected by the sweep non-uniformity of the tunable laser source. Typical variations of the heterodyne beat signal due to the sweep non-uniformity are substantially larger than those induced by the measured dispersion of the optical component. In characterizing optical components, typical optical measurement systems or optical network analyzers include two interferometers, a non-dispersive reference interferometer and a test interferometer that includes the optical component or device under test (DUT) being measured. The reference interferometer is used for measuring the non-uniform sweep of the tunable laser source, where the measurement of the non-uniform sweep is utilized for compensation of the measurement from the test interferometer. Heterodyne beat signals from both interferometers may vary in frequency, phase, and amplitude. The precision of the amplitude and phase detection of the beat signals from the interferometers determines the accuracy of characterization of the optical component.

In computing optical characteristics of the optical component, the heterodyne beat signals from the interferometers are utilized to compute optical frequency of the tunable laser source and a reflection or transmission transfer function, including amplitude and phase, of the optical DUT. In determining the amplitude and phase characteristics of the heterodyne beat signal, orthogonal filters may be utilized. The orthogonal filters are formed by in-phase and quadrature filters or other acceptable orthogonal filters in the time and/or frequency domain. Reflection or transmission transfer functions and group delay of the optical component may be determined from the amplitude and phase of the heterodyne beat signals. The reflection or transmission characteristics may be determined using various computational methods, including subtraction, division, and clocking.

With reference to FIG. 1, an optical network analyzer 102 in accordance with the present invention is shown. The analyzer measures optical characteristics of the optical device under test 104. In particular, the analyzer determines the amplitude of the reflection transfer function and the group delay of the optical DUT 104. As an example, the optical DUT may be a fiber Bragg grating, although the optical DUT may be any optical component. The optical network analyzer computes the amplitude and phase of the transfer function of the optical DUT in an efficient manner using an interferometric method based on orthogonal filters of AC coupled heterodyne beat signals. The group delay is determined from the phase response.

The optical network analyzer 102 includes a reference interferometer 106, a test interferometer 108, and a processing unit 110. As illustrated in FIG. 1, the reference and test interferometers 106 and 108 are configured as Michelson interferometers to measure the reflective characteristics of the optical DUT 104. However, other types of interferometers could instead be used. For example, the interferometers 106 and 108 may be configured as Mach-Zehnder interferometers to measure the transmissive characteristics of the optical DUT 104. Alternatively, rather than using a reference interferometer, an optical or electronic counter as known in the art may be utilized to detect the phase of the continuously tunable laser source. The reference and the test interferometers 106 and 108 both utilize a continuously tunable laser source 112. The continuously tunable laser source 112 is configured to generate an optical signal having a frequency that continuously sweeps across a predefined range of frequencies. Such light sources typically sweep across frequencies in a non-uniform manner. That is, the rate of change in frequency of the optical signal generated by the tunable laser source varies with time as the predefined range of frequencies is swept.

As explained in detail below, the transfer function of the optical DUT 104 is computed by measuring the amplitude and the phase changes of an AC coupled heterodyne beat signal from the test interferometer 108 caused by the optical DUT 104. The heterodyne beat signal is produced from an input optical signal generated by the continuously tunable laser source 112. However, due to the frequency sweep non-uniformity of the laser source, the optical frequency changes of the input optical signal are non-uniform. The non-uniformity introduces undesired frequency/phase changes into the heterodyne beat signal. The reference interferometer 106 and the processing unit 110 form an optical frequency counter that measures the undesired phase changes caused by the non-uniform optical frequency sweep of the input optical signal. Alternative optical frequency counters as known in the art may be utilized. The reference interferometer 106 produces a reference heterodyne beat signal that includes the phase changes caused by the frequency sweep non-uniformity of the tunable laser source. Additionally, the reference heterodyne beat signal may include amplitude variations caused by the tunable laser source. The reference heterodyne beat signal is then detected to measure the undesired phase changes. Since the measured phase changes are common to both interferometers 106 and 108, the distortions due to the non-uniform frequency sweep can be removed from the heterodyne beat signal produced by the test interferometer 108 using the reference heterodyne beat signal from the reference interferometer 106.

The reference interferometer 106 of the optical network analyzer 102 includes the continuously tunable laser source 112, an optical coupler 114, Faraday mirrors 116 and 118, and a reference detector 120. These components of the reference interferometer 106 are connected to each other by optical fibers 122, 124, 126, and 128. The optical fiber 122 connects the tunable laser source to the optical coupler 114, while the optical fiber 126 connects the reference detector 120 to the optical coupler 114. Similarly, the optical fiber 124 connects the optical coupler 114 to the Faraday mirror 118, while the optical fiber 128 connects the optical coupler 114 to the Faraday mirror 116. The optical coupler 114 and the optical fibers 122, 124, 126, and 128 are single mode (SM) components. The length of the optical fiber 128 differs from the length of the optical fiber 124 by the distance $\Delta L_R$ that introduces delay into the reference interferometer 106 and defines its free spectral range (FSR).

In operation, the tunable laser source 112 continuously generates an optical signal in a sweeping range of frequencies. As an example, the tunable laser source 112 may frequency sweep over an approximately 140 nm wavelength range starting from a wavelength of 1470 nm or 1510 nm. The optical signal generated by the tunable laser source 112 is transmitted to the optical coupler 114 through the optical fiber 122. The optical coupler 114 then divides the optical signal into two optical signals so that the divided optical signals are transmitted to the Faraday mirrors 116 and 118 through the optical fibers 128 and 124, respectively. The optical signal transmitted through the optical fiber 128 is reflected back to the optical coupler 114 by the Faraday mirror 116 at the end of the optical fiber 128. Similarly, the optical signal transmitted through the optical fiber 124 is reflected back to the optical coupler 114 by the Faraday mirror 118 at the end of the optical fiber 124. The Faraday mirrors 116 and 118 reflect light in respective substantially orthogonal polarization states, thereby ensuring that the returning optical signals have nearly the same polarization state.

Due to the extra distance traveled by the optical signal in the optical fiber 128, the frequency of the returning optical signal in the optical fiber 128 differs from the frequency of the returning optical signal in the optical fiber 124 at a given moment in time. As illustrated in FIG. 1, the frequency of the returning optical signal in the optical fiber 124 is denoted by $v_1$, and the frequency of the returning optical signal in the optical fiber 128 is denoted by $v_2$. Assuming the tunable laser source 112 sweeps the predefined range of frequencies at the rate $\gamma$, the optical frequencies $v_1$ and $v_2$ may be expressed as:

$$v_1 = \gamma t + v_0$$

$$v_2 = \gamma t - \gamma \tau + v_0,$$

where $v_0$ is the initial optical frequency of the tunable laser source, and $\tau$ is the round trip delay in the length $\Delta L_R$ of the optical fiber 128. The round trip delay $\tau$ is defined as:

$$\tau = \frac{2n \Delta L_R}{c},$$

where n is the refractive index of the optical fiber 128 and c is the speed of light in a vacuum. Assuming the constant sweep rate, $\gamma$, the frequency difference between the returning optical signals in the optical fibers 124 and 128 is:

$$\Delta v = \gamma \tau$$

The reference interferometer 106 is assumed to be non-dispersive, i.e., $\tau$ does not depend on the optical frequency of the optical signals. Alternatively, the reference interferometer 106 may be dispersion compensated. The phase difference between the two reflected signals may then be expressed as:

$$\Theta = 2\pi \Delta v t + \Theta_0 = 2\pi \gamma \tau t + \Theta_0,$$

where $2\pi \Delta v$ is the angular frequency difference.

The returning optical signals in the optical fibers 124 and 128 are combined at the optical coupler 114 and transmitted to the reference detector 120 through the optical fiber 126. When combined, the optical signal returning from the optical fiber 124 interferes with the optical signal returning from the optical fiber 128. The intensity of the interfering optical signals observed at the reference detector may be expressed as:

$$I = I_0 + I_0 \cos(2\pi \gamma \tau t + \Theta_0)$$

with the assumption that the polarization state of the returning optical signals is the same. The term $I_0 \cos(2\pi \gamma \tau t + \Theta_0)$ defines the heterodyne beat signal produced by the returning optical signals. At the reference detector 120, the heterodyne beat signal is AC coupled by removing the DC component of the signal. The AC coupled heterodyne beat signal is transmitted to the processing unit 110 for signal processing (e.g., determining group delay of the optical DUT 104).

The test interferometer 108 of the optical network analyzer 102 includes the continuously tunable laser source 112, an optical coupler 130, a mirror 132, the optical DUT 104, and a DUT detector 134. Similar to the reference interferometer 106, the components of the test interferometer 108 are connected to each other by optical fibers 136, 138, 140 and 142. The optical fiber 140 connects the tunable laser source 112 to the optical coupler 130, while the optical fiber 136 connects the DUT detector 134 to the optical coupler 130. Similarly, the optical fiber 142 connects the optical coupler 130 to the mirror 132 that may be a gold mirror, while the optical fiber 138 connects the optical coupler to the optical DUT 104. An additional polarization controller may be used in one of the arms to match the polarization states of the returning optical signals. The optical coupler 130 and the optical fibers 136, 138, 140 and 142 are also single mode (SM) components. The length of the optical fiber 138 differs from the length of the optical fiber 142 by the distance $\Delta L_D$ that introduces delay into the test interferometer 108 and defines its free spectral range.

The operation of the test interferometer 108 is similar to the operation of the reference interferometer 106. However, the round trip delay $\tau_T$ for the test interferometer 108 is dependent on the frequency of the optical signal from the tunable laser source 112 due to the dispersion within the optical DUT 104, or expressed mathematically, $\tau_T = \tau_T(v)$. In addition, the amplitude of the heterodyne beat signal depends on the transmission or reflection properties of the DUT. The amplitude and phase response of the optical DUT 104 may be derived by measuring changes in phase and amplitude of the heterodyne beat signal observed at the DUT detector 134.

The phase of the heterodyne beat signal of the test interferometer 108 is modified by the sweep non-uniformity of the tunable laser source 112. That is, the fact that the tunable laser source sweeps frequencies in a non-uniform manner with respect to time introduces additional phase shift into the phase of the heterodyne beat signal detected at the DUT detector 134 of the test interferometer 108. The same phenomenon exists for the reference interferometer 106. Therefore, both interferometers contain information about the non-uniform frequency sweep of the tunable laser source 112. The effect of the non-uniform frequency sweep by the tunable laser source is described below with reference to FIGS. 2–6.

Figure 2:
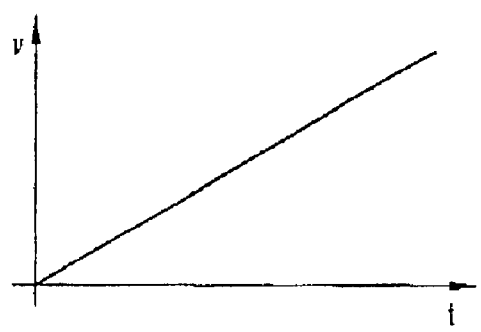
FIG. 2 illustrates the frequency sweep of an ideal continuously tunable laser source with respect to time in accordance with one embodiment of the present invention.
Figure 3:
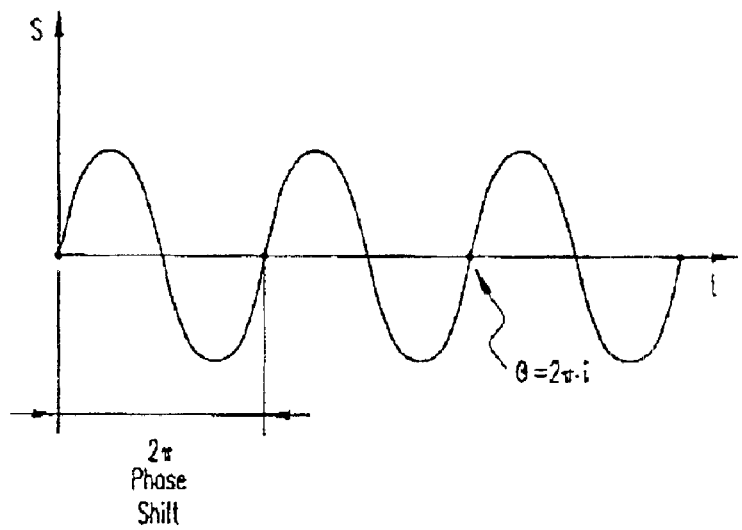
FIG. 3 illustrates the AC coupled heterodyne beat signal when an ideal continuously tunable laser source is used in accordance with one embodiment of the present invention.
Figure 4:
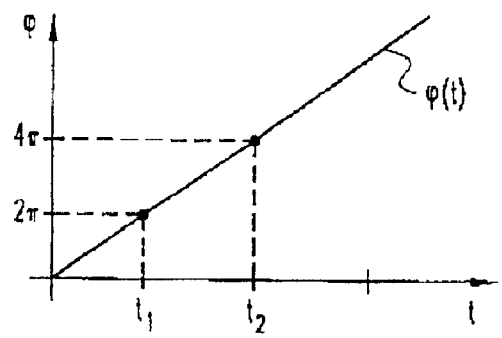
FIG. 4 illustrates a phase function of the heterodyne beat signal of FIG. 3 in accordance with one embodiment of the present invention.

Assuming that the tunable laser source 112 is an ideal tunable laser source that continuously sweeps the predefined range of frequencies (e.g., optical C- and L-bands) uniformly with respect to time, the change of frequency with respect to time for the optical signals generated by the laser source is linear, as illustrated in FIG. 2. Consequently, if the device under test has no dispersion, then the resulting AC coupled heterodyne beat signal is a pure sine wave of constant frequency as shown in FIG. 3. The phase, $\phi(t)$, of the heterodyne beat signal is linear as illustrated in FIG. 4.

Figure 5:
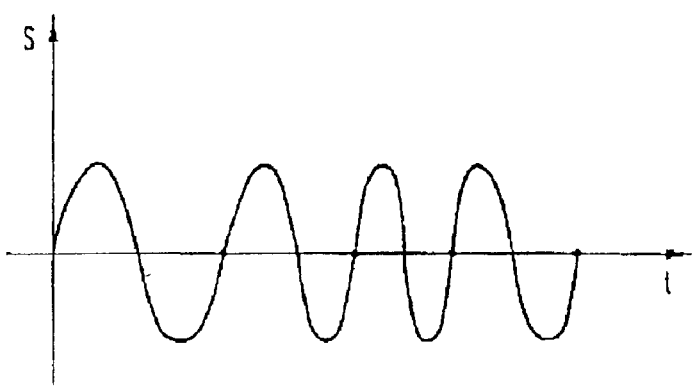
FIG. 5 illustrates the AC coupled heterodyne beat signal when a continuously tunable laser source that sweeps frequencies non-uniformly with respect to time is used in accordance with one embodiment of the present invention.
Figure 6:
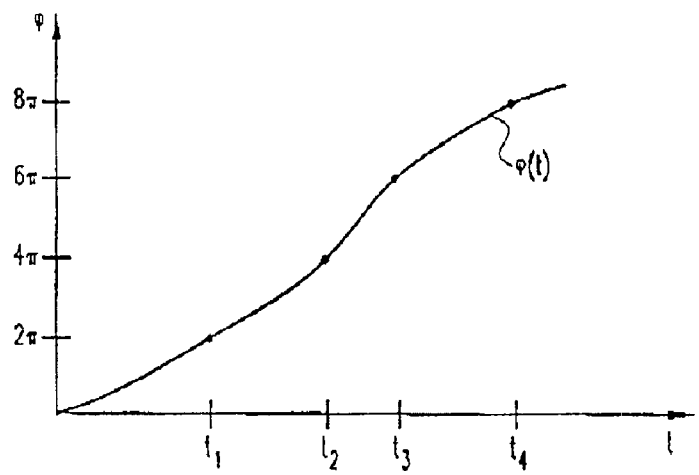
FIG. 6 illustrates a phase function of the heterodyne beat signal of FIG. 5 in accordance with one embodiment of the present invention.

However, for the tunable laser source 112 that sweeps frequencies non-uniformly, the frequency of the heterodyne beat frequency varies, as illustrated in FIG. 5. Consequently, the phase variation $\phi(t)$ with respect to time is non-linear, as illustrated in FIG. 6. Therefore, changes in phase of the heterodyne beat signal at the DUT detector 134 and at the reference detector 120 are strongly influenced by the sweep non-uniformity of the tunable laser source. The phase changes due to the dispersive characteristics of the optical DUT 104 observed at the DUT detector 134 are indistinguishable from and dominated by phase changes induced by the sweep non-uniformity of the tunable laser source 112.

The optical network analyzer 102 resolves the problem of phase changes being generated by the non-uniform sweep frequency of the tunable laser source 112 by determining phase of the heterodyne beat signal from the reference interferometer 106 to effectively "compensate" for the non-uniformity of the sweep of the tunable laser source 112. This compensation leads to the recovery of the true linear optical frequency scale as performed in classical network analyzers. The quality of the optical network analyzer depends on the precision of the recovered amplitude and phase of the heterodyne beat signal s(t).

Four exemplary orthogonal filter embodiments are provided for computing amplitude and phase of the heterodyne beat signals s(t) from the reference and test interferometers 106 and 108. The four embodiments of the orthogonal filters include: (i) in-phase and quadrature filtering in the time domain utilizing convolution, (ii) in-phase and quadrature filtering in the frequency domain, (iii) single sided filtering, and (iv) all-pass filtering utilizing Hilbert transforms.

Figure 7:
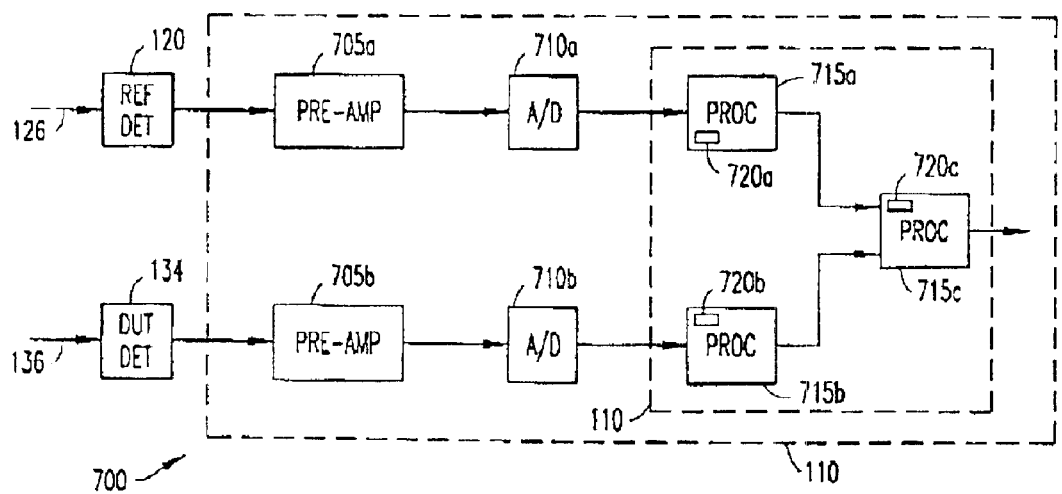
FIG. 7 is an exemplary block diagram for processing the optical signals measured by optical detectors according to FIG. 1 in accordance with one embodiment of the present invention.

FIG. 7 is an exemplary block diagram 700 for measuring and processing the heterodyne beat signals s(t) produced by the reference and test interferometers 106 and 108 of FIG. 1. The optical fibers 126 and 136 are optically coupled to reference 120 and DUT 134 detectors, respectively. The reference 120 and DUT 134 detectors are coupled to preamplifiers 705a and 705b, respectively. The preamplifiers are further coupled to analog-to-digital (A/D) converters 710a and 710b that are also coupled to the processing unit 110. The processing unit 110 may include a reference processor 715a to process data from the reference detector 120 and a test processor 715b to process data from the DUT detector 134. Each of the processors 715a and 715b are coupled to a common processor 715c. The processors 715a, 715b, and 715c may be coupled to internal memory 720a, 720b, and 720c (cumulatively 720), respectively. Alternatively, the memory 720 may be external to the processors 715a–715c.

In operation, the reference and DUT detectors 120 and 134 receive optical signals from the reference and test interferometers 106 and 108 (not shown) and convert the optical signals into electrical signals. The electrical signals represent heterodyne beat signals generated by the interferometers 106 and 108. The electrical signals are communicated to the processing unit 110 for processing the heterodyne beat signals and computing the transfer function and group delay of the optical DUT 104.

The preamplifiers 705a and 705b receive the electrical signals from the reference and DUT detectors 120 and 134, respectively. The preamplifiers 705a and 705b are used to filter and/or scale the electrical signals. The A/D converters 710a and 710b convert the analog signals received from the preamplifiers 705a and 705b into digital signals. The digital signals are received from the A/D converters 710a and 710b by the processors 715a and 715b, respectively, to compute amplitude and phase of the heterodyne beat signals produced by the reference and test interferometers 106 and 108. The amplitude and phase signals may be computed by utilizing orthogonal filters, and are received by the common processor 715c that computes the transfer function and group delay of the optical DUT 104. It should be understood that the processing unit 110 may alternatively be a single processor for performing the computations. The processors 715a–715c may be general purpose processors or specialized processors, such as digital signal processors (DSP). Alternatively, digital devices other than processors, such as a programmable logic gate array, may be utilized in the processing unit 110 to perform the computations. In another embodiment, rather than converting the analog signals to digital signals, the processing unit 110 may determine the transfer function using analog components.

To further understand the heterodyne beat signals s(t) received from the interferometers 106 and 108 and how the heterodyne beat signals are utilized in processing the transfer function of the optical DUT 104, the following description is provided. A frequency difference between the interfering optical waves giving rise to the heterodyne beat signal is $\Delta v = f_B = \gamma \tau_T$, where $\gamma$ is the optical frequency sweep rate and $\tau_T$ is the round trip delay of the test interferometer 108. For the reference interferometer 106, $\tau_R$ is independent of the optical frequency (i.e., $\tau_R(v) = \tau_R =$ constant). For the test interferometer 108, $\tau_T$ may change with the optical frequency produced by the tunable laser source 112 to provide information about dispersive properties of the optical DUT 104. In general, the sweep rate $\gamma$ is not constant (i.e., $\gamma = \gamma(t)$). Therefore, the heterodyne beat frequency changes with time and optical frequency. The heterodyne beat frequency may be computed as:

$$f_B = f_B(t, v) = \int_{t-\tau_T(v)}^{t} \gamma(\zeta) d\zeta$$

The reference and test interferometers 106 and 108 are used to distinguish between the phase changes in the heterodyne beat frequency due to the non-uniform sweep of the tunable laser source 112 and dispersion of the optical DUT 104. The heterodyne beat signal measured by the test interferometer 108 varies not only in frequency, but also in amplitude as reflectance or transmittance of an optical DUT 104 changes with the optical frequency. Therefore, the signals measured have an oscillatory character with a modulated amplitude and frequency (phase). The precision with which the amplitude and the phase of the heterodyne beat signals is detected establishes performance of the optical component analyzer.

Figure 8:
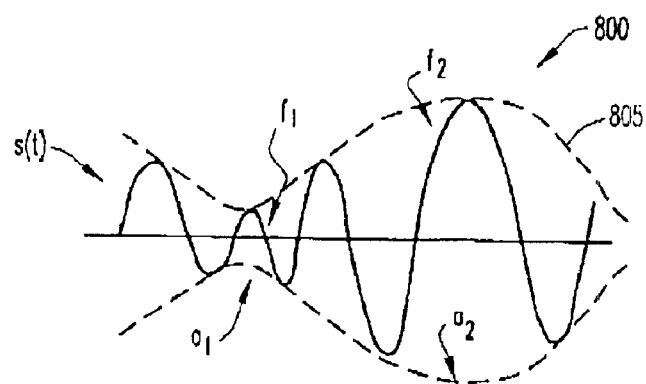
FIG. 8 illustrates a heterodyne beat signal as formed by the optical network analyzer of FIG. 1 in accordance with one embodiment of the present invention.

FIG. 8 illustrates an exemplary heterodyne beat signal s(t) 800 with a varying amplitude and frequency. Heterodyne beat signal s(t) 800 originates from the DUT interferometer. The varying amplitude, shown by envelope 805, has a minimum amplitude $a_1$ and a maximum amplitude $a_2$, where $a_1 < a_2$. The varying frequency of the heterodyne beat signal s(t) has a maximum frequency $f_1$ and a minimum frequency $f_2$, where $f_1 > f_2$.

Orthogonal filters may be used to measure the heterodyne beat signal s(t) of FIG. 8. In particular, orthogonal filters can be used to recover the amplitude and phase of the heterodyne beat signal s(t). A spectral component of a signal at a frequency $f_0$ can be determined by calculating a correlation of the signal at frequency $f_0$ with a signal periodically varying at the frequency $f_0$ (i.e., with $\cos(2\pi f_0 t)$). The spectral component may be computed as:

$$x_{f_0}(t) = \lim_{T \to \infty} \frac{1}{T} \int_{-\frac{T}{2}}^{\frac{T}{2}} s(t+\tau)\cos(2\pi f_0 \tau) d\tau$$

The broader spectrum of frequencies may be detected by selecting a periodically varying function that does not extend from $-\infty$ to $+\infty$, but rather is limited by an envelope, h(t), decaying to zero for final values of time.

Figure 9:
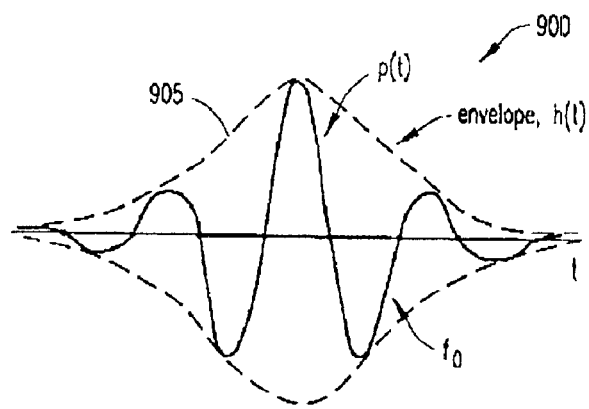
FIG. 9 illustrates a filter function for in-phase detection of amplitude and phase of the heterodyne beat signal of FIG. 8 in accordance with one embodiment of the present invention.
Figure 10:
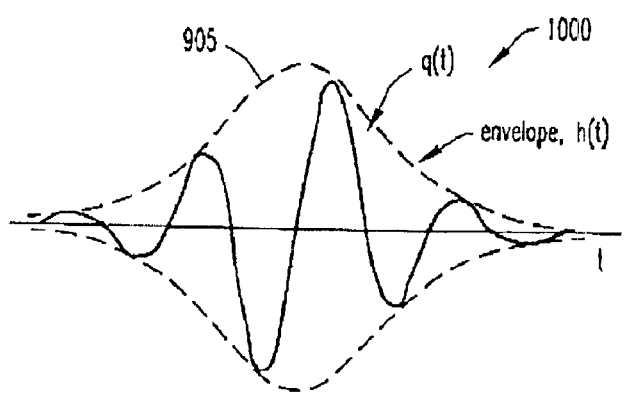
FIG. 10 illustrates a filter function for quadrature detection of amplitude and phase of the heterodyne beat signal of FIG. 8 in accordance with one embodiment of the present invention.

The first exemplary embodiment of the orthogonal filters includes in-phase and quadrature filters in the time domain as provided in FIGS. 9 and 10. FIG. 9 illustrates an in-phase filter for detecting a frequency band center around $f_0$. The function in FIG. 9 is described by $p(t) = h(t)\cos(2\pi f_0 t)$. The envelope 905 is described by a function h(t). Because correlation of the heterodyne beat signal with the function p(t) recovers the original heterodyne beat signal s(t) without changing its phase, the filter function p(t) describes the in-phase filter. The in-phase component, x(t), of the heterodyne beat signal may therefore be computed by:

$$x(t) = \int_{-\infty}^{\infty} s(t+\tau)p(\tau)\,d\tau.$$

FIG. 10 illustrates a quadrature filter that may be used for the detection of a frequency band centered around $f_0$. The quadrature filter is defined in a similar manner as the in-phase filter. The phase shift of $\pi/2$ is realized by replacing the cosine function of the in-phase filter with a sine function. The envelope h(t) is the same as the envelope 905 of the in-phase filter, thereby maintaining the same spectral response of the in-phase filter 900. The equation $q(t)=h(t)\sin(2\pi f_0 t)$ describes the quadrature filter. Correlation of the heterodyne beat signal s(t) with the function q(t) shifts the phase of the heterodyne beat signal s(t) by $\pi/2$:

$$y(t) = \int_{-\infty}^{\infty} s(t+\tau)q(\tau)\,d\tau,$$

where y(t) is the quadrature component of the heterodyne beat signal s(t).

Once the in-phase and quadrature components are known, then the amplitude and phase of the incoming signal can be calculated as:

$$r(t)=\sqrt{x^2(t)+y^2(t)}\text{(amplitude)}$$

and $$\phi(t)=\arctan(x(t)/x(t))\text{(phase)}$$

It is worth noting that for the selected in-phase p(t) and quadrature q(t) filters, correlation is the same as convolution with exception of the sign of q(t). Since sign is irrelevant in the instant process of determining the optical characteristics, either correlation or convolution may be utilized.

Figure 11:
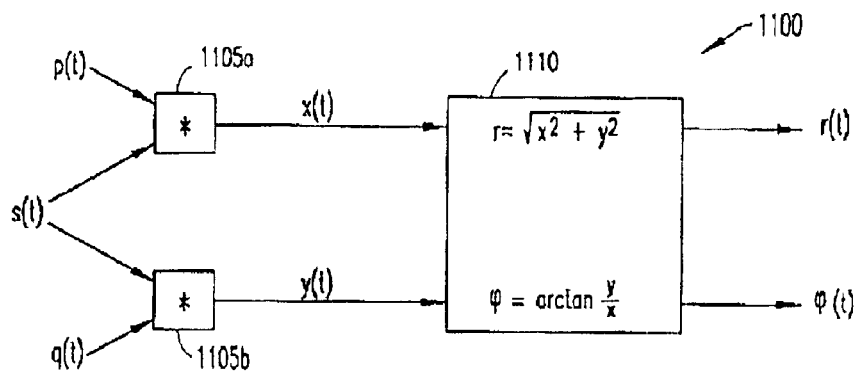
FIG. 11 is an exemplary block diagram for applying the filter functions to determine amplitude and phase of the heterodyne beat signal of FIG. 8 in the time domain in accordance with one embodiment of the present invention.

FIG. 11 is an exemplary block diagram for computing amplitude and phase of the heterodyne beat signal s(t) in time domain. The in-phase filter p(t) is convolved with the heterodyne beat signal s(t) at 1105a to produce a time domain signal x(t), where the time domain signal is the in-phase component of the heterodyne beat signal. The quadrature filter q(t) is convolved with the heterodyne beat signal s(t) at 1105b to produce a time domain signal y(t), where y(t) is the quadrature component of the heterodyne beat signal s(t). The quadrature signals, x(t) and y(t), are utilized by function 1110 to produce the amplitude and phase of the heterodyne beat signal s(t).

The second exemplary embodiment of the orthogonal filters includes in-phase and quadrature filters in the frequency domain. In the time domain, the in-phase filter p(t) is mathematically represented as a product of the envelope function h(t) and $\cos(2\pi f_0 t)$.

$$p(t)=h(t)\cos(2\pi f_0 t)=h(t)\cos(\omega_0 t),$$

where $\omega_0$ is the angular frequency. The above equation can be rewritten as:

$$p(t) = h(t)\frac{e^{-j\omega_0 t} + e^{j\omega_0 t}}{2}$$

Assume that the Fourier transform of h(t) is represented by $H(\omega)$, i.e., $F[h(t)]=H(\omega)$, then $$P(\omega) = F[p(t)] = F\left[\frac{1}{2}h(t)e^{-j\omega_0 t} + \frac{1}{2}h(t)e^{j\omega_0 t}\right]$$

$$= \frac{1}{2}H(\omega+\omega_0) + \frac{1}{2}H(\omega-\omega_0)$$

The function $H(\omega-\omega_0)$ represents a bandpass filter centered at the angular frequency $\omega_0$. The shape of the bandpass filter is uniquely defined by the envelope function h(t) in the time domain representation of the filter. It should be understood that the narrower the envelope h(t) is in the time domain, the wider the filter $H(\omega)$ is in the frequency domain. Because of this time-frequency relationship, the selection of the quickly decaying envelope h(t) in FIGS. 9–10 results in the wide passband in the frequency domain.

An analogous procedure is used to derive the quadrature filter $Q(\omega)$, wherein:

$$Q(\omega) = -\frac{1}{2}jH(\omega+\omega_0) + \frac{1}{2}jH(\omega-\omega_0).$$

The quadrature filter $Q(\omega)$ provides the same frequency response $H(\omega-\omega_0)$, however, the phase is shifted by $\pi/2$. Since in-phase filter p(t) is real and even, the Fourier transform $P(\omega)$ is also real and even. The quadrature filter q(t) is real and odd, therefore, the Fourier transform $Q(\omega)$ is odd and imaginary.

Figure 12A:
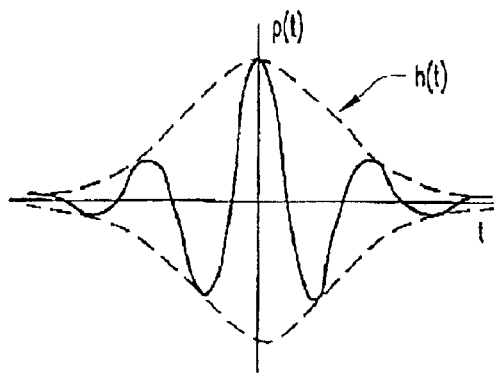
FIGS. 12A–12D illustrate orthogonal filters in the time and frequency domains as applied in FIG. 11 in accordance with one embodiment of the present invention.
Figure 12B:
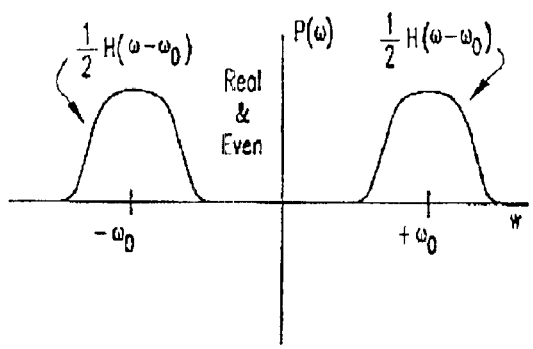
Figure 12C:
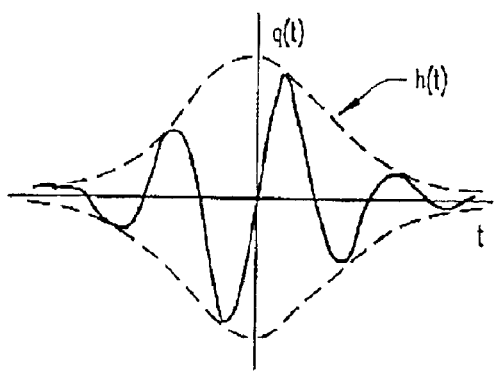
Figure 12D:
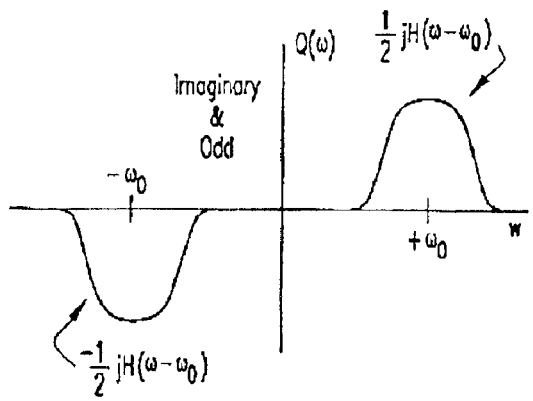

FIGS. 12A and 12B are the time and frequency domain representations of the in-phase filter in both the time and frequency domains, respectively. FIGS. 12C and 12D depict the quadrature filter in the time and frequency domains, respectively.

Figure 13:
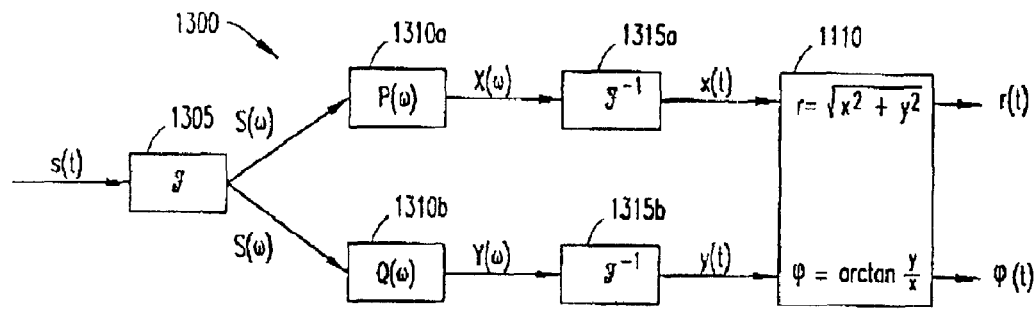
FIG. 13 is another exemplary block diagram for computing amplitude and phase of the heterodyne beat signal of FIG. 8 in the frequency domain in accordance with one embodiment of the present invention.

When implementing the orthogonal filters in the frequency domain, the heterodyne beat signal s(t) is: (i) transformed to the frequency domain, (ii) filtered using $P(\omega)$ and $Q(\omega)$, and (iii) transformed back to the time domain. One reason for implementing the orthogonal filters in the frequency domain is that the computations in the frequency domain, which include addition and multiplication, are computationally faster and more efficient than computations in the time domain, which include convolution. The time-to-frequency and frequency-to-time conversions are performed because convolution may be performed as multiplication in the frequency domain. This process is illustrated in FIG. 13 in the form of a block diagram 1300 and constitutes another exemplary embodiment for computing the amplitude and phase of the heterodyne beat signal s(t). The heterodyne beat signal s(t) is transformed by the Fourier transform 1305 into the frequency domain $S(\omega)$. The heterodyne beat signal $S(\omega)$ in the frequency domain is filtered by an in-phase filter $P(\omega)$ 1310a and a quadrature phase filter $Q(\omega)$ 1310b to generate signals $X(\omega)$ and $Y(\omega)$, respectively. The signals $X(\omega)$ and $Y(\omega)$ are transformed from the frequency domain back to the time domain via an inverse Fourier transform 1315a and 1315b. The time domain signals x(t) and y(t) resulting from the inverse Fourier transform operations are received by the function 1110. The function 1110 computes the time domain amplitude r(t) and phase $\phi(t)$ of the heterodyne beat signal s(t).

The third exemplary embodiment of the orthogonal filters includes single-sided filtering. The orthogonal filters may be represented by a transfer function $T(\omega)$ having real and imaginary parts defined by $P(\omega)$ and $Q(\omega)$, respectively. Mathematically, the transfer function $T(\omega)$ may be described as $$T(\omega)=P(\omega)-jQ(\omega).$$

Output z(t) of the single-sided filter, in response to the heterodyne beat signal s(t), is imaginary. The signal x(t) is the real part of the output z(t), while the signal y(t) is the imaginary part of z(t), where z(t) may be expressed as z(t)=x(t)−jy(t). The signals x(t) and y(t), are in quadrature (i.e., 90 degrees out of phase).

The output z(t) is an analytic signal with respect to x(t), and may be expressed as $$z(t)=r(t)\exp(j\phi(t)),$$

where the amplitude $r(t)=\sqrt{x^2(t)+y^2(t)}$ and the phase $$\varphi(t) = \arctan\frac{y(t)}{x(t)}.$$

Figure 14:
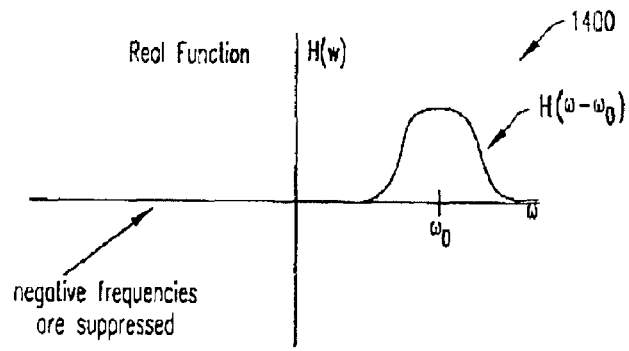
FIG. 14 illustrates a transfer function of a positive frequency bandpass filter centered at an angular frequency for computing amplitude and phase of the heterodyne beat signal of FIG. 8 in accordance with one embodiment of the present invention.

Typically, the sign of the phase φ(t) is irrelevant. The amplitude and phase of the heterodyne beat signal s(t) may be found as the absolute value of z(t) and the argument of z(t), expressed as r(t)=|z(t)| and φ(t)=arg(z(t)). By using expressions for $P(\omega)$ and $Q(\omega)$, the transfer function $T(\omega)$ may be expressed in terms of function $H(\omega)$. Therefore, the transfer function $T(\omega)$ is uniquely described by $H(\omega-\omega_0)$ and, as before, represented as a band-pass filter being centered at the angular frequency $\omega_0$. However, the transfer function or filter $T(\omega)$ operates on the positive frequencies only while the negative frequencies are suppressed (i.e., single-sided filtering). In the time domain, the function t(t) is complex with its real and imaginary parts being described by the in-phase p(t) and quadrature q(t) filters. The transfer function $T(\omega)$ is illustrated in FIG. 14.

Figure 15:
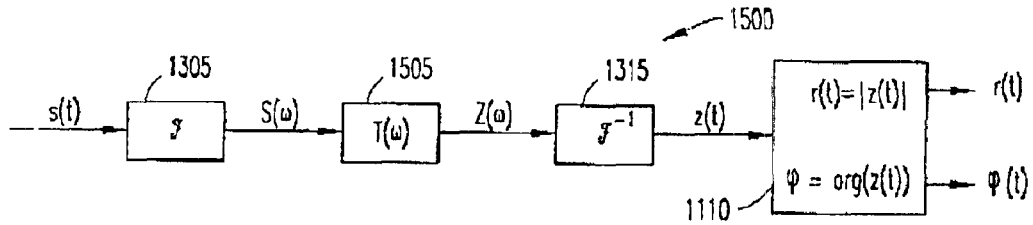
FIG. 15 is another exemplary block diagram for computing amplitude and phase of the heterodyne beat signal of FIG. 8 in frequency domain using the transfer function of FIG. 14 in accordance with one embodiment of the present invention.

FIG. 15 is another exemplary block diagram for computing the amplitude and phase of the heterodyne beat signal s(t). The heterodyne beat signal s(t) is transformed into the frequency domain, $S(\omega)$ by the Fourier transform 1305. The transformed heterodyne beat signal $S(\omega)$ is received and filtered by a transfer function $T(\omega)$ 1505 to produce signal $Z(\omega)$. The signal $Z(\omega)$ is transformed to the time domain via the inverse Fourier transform 1315. The function 1110 produces the amplitude r(t) and phase φ(t) of the heterodyne beat signal s(t).

Figure 16A:
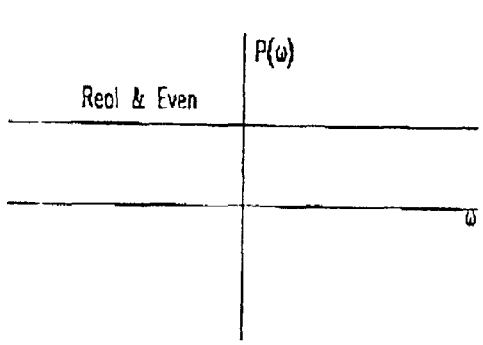
FIGS. 16A and 16B illustrate graphs of in-phase and quadrature filters, respectively, used in computing amplitude and phase of the heterodyne beat signal of FIG. 8, where
Figure 16B:
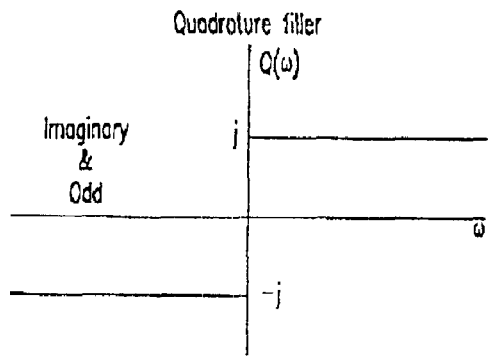

The fourth exemplary embodiment of the orthogonal filters includes performing all-pass filtering. The all-pass filters are a special case of orthogonal filters. The sweep rate of the tunable laser typically varies around some nominal sweep rate γ, resulting in the heterodyne beat frequency varying around $\gamma\tau_T$, where $\tau_T$ is a round trip delay of the test interferometer 108. Therefore, the natural selection of the filter type is a band-pass filter. However, an all-pass filter may also be considered. In implementing an all-pass filter, the quadrature filter q(t) may be implemented by a Hilbert transform. Shown in FIGS. 16A and 16B are all-pass orthogonal filters in the frequency domain, where the in-phase and quadrature filters are illustrated. As shown, the in-phase filter $P(\omega)$ is real and even. The quadrature filter $Q(\omega)$ is shown to be imaginary and odd. The exemplary block diagram for the all-pass orthogonal filters in the frequency domain is the same as that in FIG. 13. As before, the heterodyne beat signal s(t) remains unchanged after being processed by the in-phase filter. The phase of the heterodyne beat signal s(t) is shifted by π/2 for all frequencies by the quadrature filter $Q(\omega)$. The resulting signal y(t) may be found in the time domain by using the Hilbert transform:

$$y(t) = \frac{1}{\pi}\int_{-\infty}^{\infty}\frac{S(\alpha)}{t-\alpha}d\alpha.$$

Figure 17:
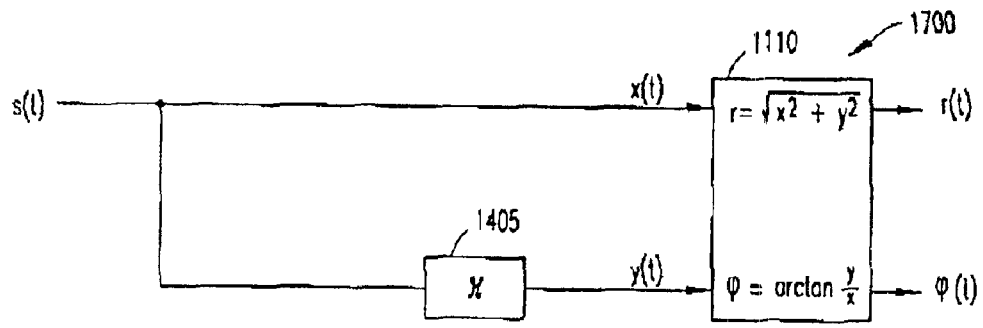
FIG. 17 is another exemplary block diagram for computing amplitude and phase of the heterodyne beat signal of FIG. 8 using the Hilbert transform of FIG. 16B in accordance with one embodiment of the present invention.

FIG. 17 is another exemplary block diagram for computing the amplitude and phase of the heterodyne beat signal s(t) utilizing the Hilbert transform. As shown, the heterodyne beat signal is received directly by the function 1110 and via the Hilbert transform 1405. The Hilbert transform 1405 performs the quadrature filtering on the heterodyne beat signal s(t) so that the function 1110 may compute the amplitude and phase of the heterodyne beat signal s(t).

Figure 18:
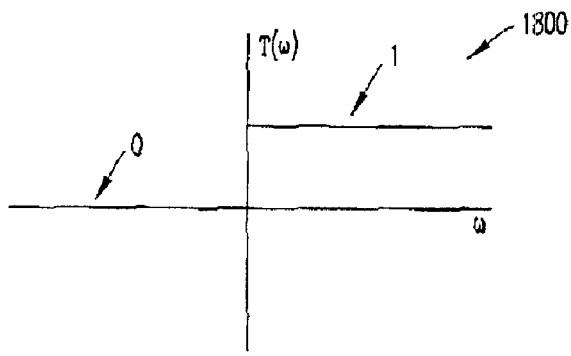
FIG. 18 illustrates a positive frequency, all-pass filter transfer function utilized in computing amplitude and phase of the heterodyne beat signal of FIG. 8 in accordance with one embodiment of the present invention.

The all-pass filter transfer function $T(\omega)$ takes a simple form. The all-pass filter suppresses the negative frequencies, while leaving the positive frequencies unchanged. This can be seen in FIG. 18 by the transfer function being shown as having zero for the negative frequencies and unity for the positive frequencies.

To this point, several methods for computing (i.e., recovering) the amplitude and phase of the heterodyne beat signal s(t) using the four exemplary embodiments of orthogonal filters have been shown, including (i) in-phase and quadrature filtering in the time domain utilizing convolution, (ii) in-phase and quadrature filtering in the frequency domain, (iii) single sided filtering, and (iv) all-pass filtering utilizing Hilbert transforms. Once the amplitude and phase information of the heterodyne beat signals are computed by utilizing orthogonal filters (of any form) from both interferometers 106 and 108, the optical characteristics of the device under test may then be computed. As shown in FIG. 1, both the reference and test interferometers 106 and 108 are used to generate amplitude and phase information. The generated amplitude and phase signals are: $r_R(t)$ (amplitude of the heterodyne beat signal from the reference interferometer 106), $\phi_R(t)$ (phase of the heterodyne beat signal from the reference interferometer 106), $r_T(t)$ (amplitude of the heterodyne beat signal from the test interferometer 108), and $\phi_T(t)$ (phase of the heterodyne beat signal from the test interferometer 108).

Since the reference interferometer 106 is non-dispersive or compensated for dispersion, the recovered phase is proportional to the optical frequency. Every 2π radians of phase change corresponds to the change in the optical frequency equal to the free spectral range (FSR) of the interferometer. Therefore, the function $\phi_R(t)$ provides a unique conversion between time and the optical frequency.

$$v(t) = \frac{\varphi_R(t)}{2\pi\tau_R},$$

where ν is the optical frequency, and $\tau_R$ is the delay in the reference interferometer 106.

Figure 19:
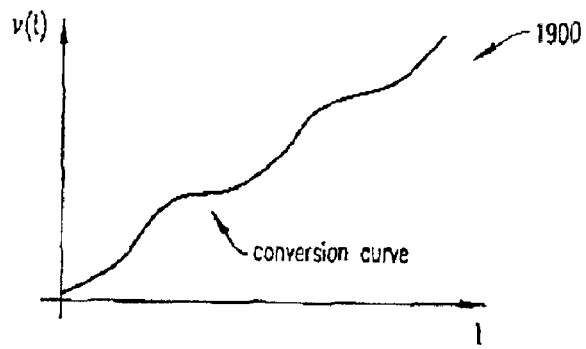
FIG. 19 illustrates a time-to-frequency conversion function in accordance with one embodiment of the present invention.
Figure 20:
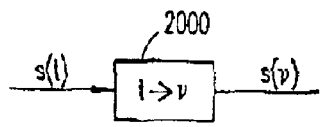
FIG. 20 is an exemplary block diagram depicting a simple conversion from the time to frequency domain in accordance with one embodiment of the present invention.

FIG. 19 is an exemplary conversion curve or function 1900 for converting between time and the optical frequency. The conversion curve 1900 is non-uniform and describes the non-uniformity of the tunable laser source. FIG. 20 depicts a simple block diagram of a process 2000 for a conversion from the time to the optical frequency domain.

Conversion from the time to the optical frequency domain may be performed by a wavelength counting device. In particular, the conversion may be performed by the reference interferometer. The heterodyne beat signal s(t) from the reference interferometer 106 may also be used for clocking the acquisition of the heterodyne beat signal from the test interferometer 108. In this embodiment, the heterodyne beat signal from the test interferometer is sampled in equal optical frequency increments. Hence, the signals recovered by the orthogonal filters depend on the optical frequency ν. The recovered signals r(ν), and φ(ν) are the amplitude and phase, respectively, of the heterodyne beat signal from the test interferometer 106.

Three exemplary methods for determining optical characteristics of the device under test, including: (i) amplitude r(ν), (ii) phase Θ(ν), and (iii) group delay $\tau_g(\nu)$, are shown that utilize the heterodyne beat signals s(t) produced by the reference and test interferometers 106 and 108. These methods include (i) phase subtraction, (ii) derivative ratio (i.e., division), and (iii) clocking.

Figure 21:
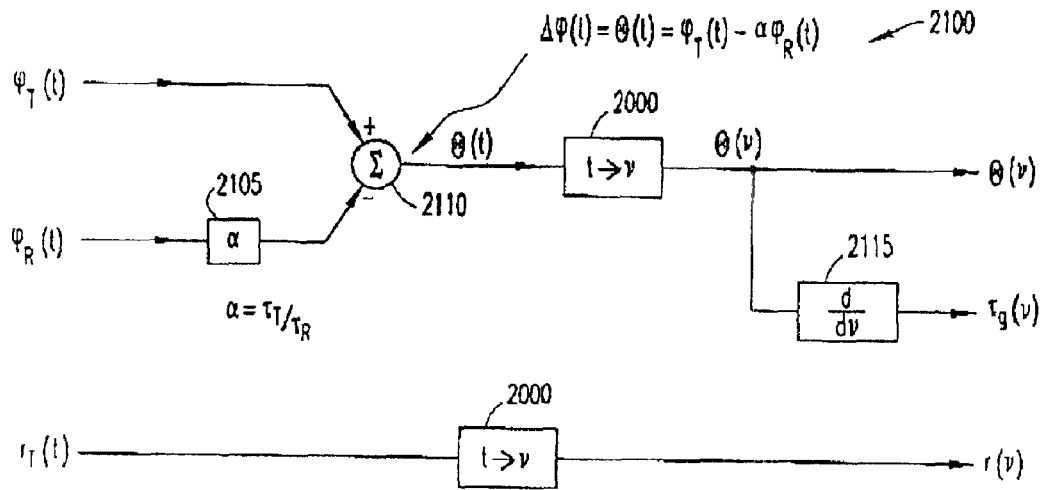
FIG. 21 is an exemplary block diagram for computing a transfer function and group delay of the optical DUT utilizing a phase subtraction method in accordance with one embodiment of the present invention.

FIG. 21 shows an exemplary block diagram 2100 that utilizes the phase subtraction method for computing the group delay of the optical DUT 104. As shown, the phase $\phi_R(t)$ generated by the reference interferometer 106 is weighted by $\alpha=\tau_T/\tau_R$ and subtracted from the test phase $\phi_T$ generated by the test interferometer 108. The subtraction removes any sweep non-uniformity related to phase perturbations of the tunable laser source. Consequently, the phase Θ(t) substantially contains information about dispersion. The phase Θ(t) is converted to an optical frequency function Θ(ν) and is then differentiated to find the group delay $\tau_g(\nu)$. The amplitude $r_T(t)$ is also converted to a function $r_T(\nu)$ in the optical frequency domain.

Figure 22:
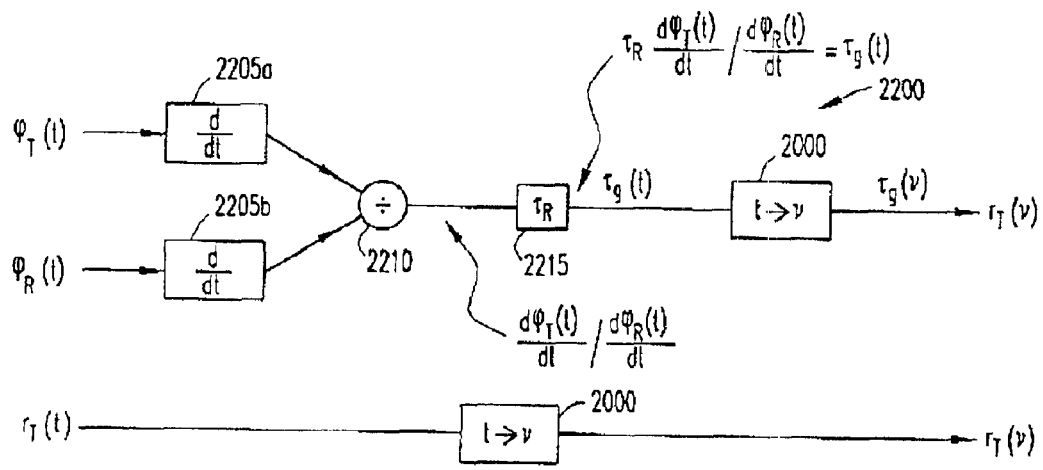
FIG. 22 is another exemplary block diagram for computing a transfer function and including group delay of the optical DUT utilizing a derivative ratio method in accordance with one embodiment of the present invention.

FIG. 22 is an exemplary block diagram 2200 that utilizes the derivative ratio method for computing the group delay of the optical DUT 104. The phase functions $\phi_T(t)$ and $\phi_R(t)$ are differentiated by differentiators 2205a and 2205b, respectively, and the differentiations of the phase functions are divided by divider 2210. The process of division removes sweep non-uniformity related perturbations. The resulting function is equal to the group delay $\tau_g(t)$ after multiplication $\tau_R$. The group delay $\tau_g(t)$ and amplitude $r_T(t)$ are converted from the time to the optical frequency functions by the conversion function 2000.

Figure 23:
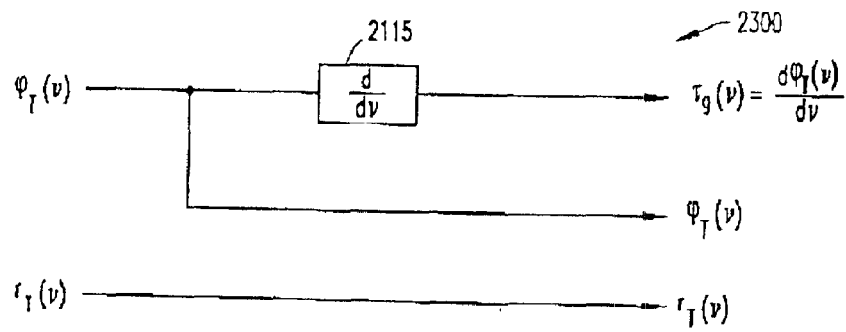
FIG. 23 is another exemplary block diagram for computing a transfer function and group delay of the optical DUT utilizing a clocking method in accordance with one embodiment of the present invention.

FIG. 23 is an exemplary block diagram 2300 that utilizes the clocking method for computing the group delay $\tau_g(\nu)$ of the optical DUT 104. The heterodyne beat signal s(t) of the reference interferometer is used to clock the acquisition of the heterodyne beat signal from the test interferometer 108. Such an implementation leads to the signal being sampled uniformly in the optical frequency domain, ν. The orthogonal filters are used to recover the optical frequency functions $\phi_T(\nu)$ and $r_T(\nu)$. The group delay $\tau_g(\nu)$ is found by computing the derivative 2115, $$\frac{d\varphi_T(\nu)}{d\nu},$$

of the phase of the heterodyne beat signal from the test interferometer 108.

Figure 24:
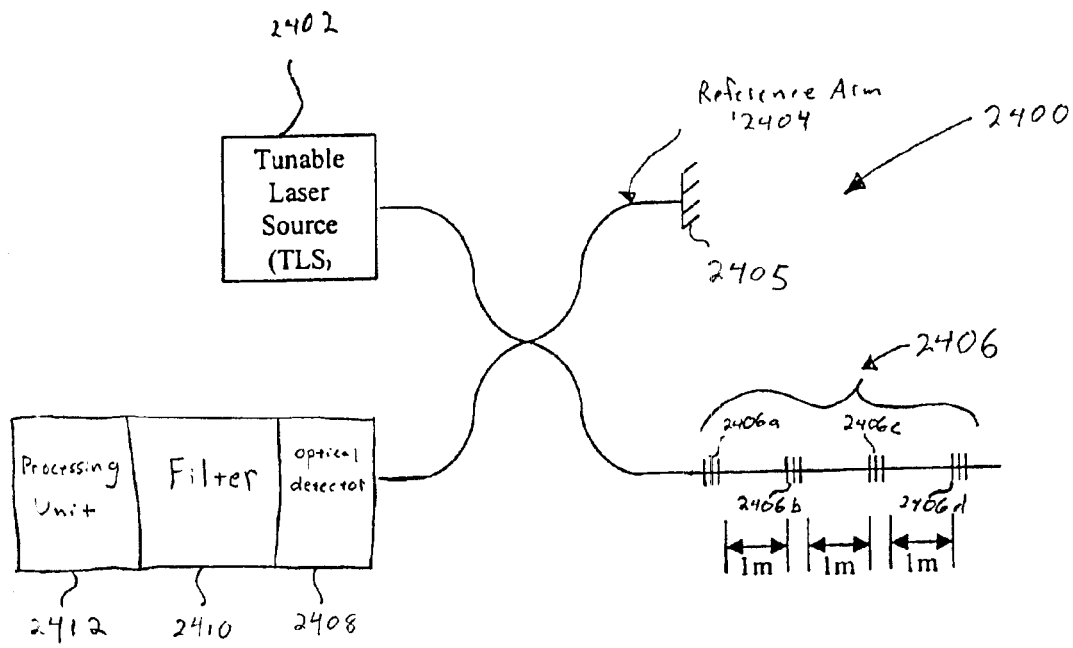
FIG. 24 is a schematic depiction of an optical network analyzer employed in conjunction with one embodiment of the present invention.

Method and System for Measuring Optical Characteristics of a Sub-component of a Composite Optical System With reference now to FIG. 24, a schematic depiction of an optical network analyzer 2400 is shown. In FIG. 24, optical network 2400 includes a light source 2402, a reference arm 2404, and composite optical system 2406 comprising a device under test (DUT). Optical network analyzer 2400 also includes an optical detector 2408, a filter 2410, and a processing unit 2412. In the present embodiment, composite optical system 2406 is comprised of a plurality of sub-components 2406a, 2406b, 2406c, and 2406d. As will be discussed in detail below, filter 2410 separates the optical response of a sub-component from the optical response of the composite optical system, and processing unit 2412 determines the optical characteristics of the sub-component by utilizing at least one portion of the optical response of the sub-component. In FIG. 24, sub-components 2406a, 2406b, 2406c, and 2406d are each depicted as fiber Bragg gratings for purposes of clarity and illustration. Although such sub-components comprise composite optical system 2406 in the present embodiment, the present invention is well suited to use with various other types of composite optical systems comprised of various other types of sub-components. That is, the present invention is well suited to use with a composite optical system in which one or all of sub-components is other than a fiber Bragg grating. Furthermore, the present invention is also well suited to use with a composite optical system having at least one sub-component which is not a conventional optical network device. Specifically, the present invention is also well suited to use with a composite optical system in which one or more of the sub-components is comprised of a spurious signal source. Such a spurious signal source may include, for example, a loose optical connector, a damaged optical fiber, and the like. Hence, the sub-component optical characterization method and system of the present embodiments, as will be described below in detail, is not limited by the nature or type of sub-components comprising the composite optical system under test. Furthermore, the term sub-component as used herein will also be intended to cover different optical characteristics of a component. As an example, in some approaches, both the reflectivity and transmissivity of a device are generated concurrently. For purposes of the present application, the term sub-component may also be used to refer to each individual characteristic of the device (e.g., reflectivity and transmissivity).

Thus, although the following discussion will specifically refer to a composite optical system comprised of multiple fiber Bragg grating sub-components, such a discussion is for purposes of illustration and is not intended to limit the type of composite optical system or type of sub-components to which the present invention is applicable.

Although shown schematically for purposes of clarity, in one embodiment optical network 2400 operates in a manner similar to, and using the principles of, for example, optical network analyzer 102 of FIG. 1. For purposes of clarity, a brief description of the operation of optical network analyzer 2400 is repeated herein. Specifically, in the present embodiment, light source 2402 is a chirped optical source (e.g., a tunable laser source) which generates light having a time-varying frequency. Optical signals from light source 2402 are divided and follow either a path leading to composite optical system 2406 or a path along reference arm 2404. Light following the reference arm path is reflected using, for example, mirror 2405, and light following the other path is reflected from composite optical system 2406.

Figure 25:
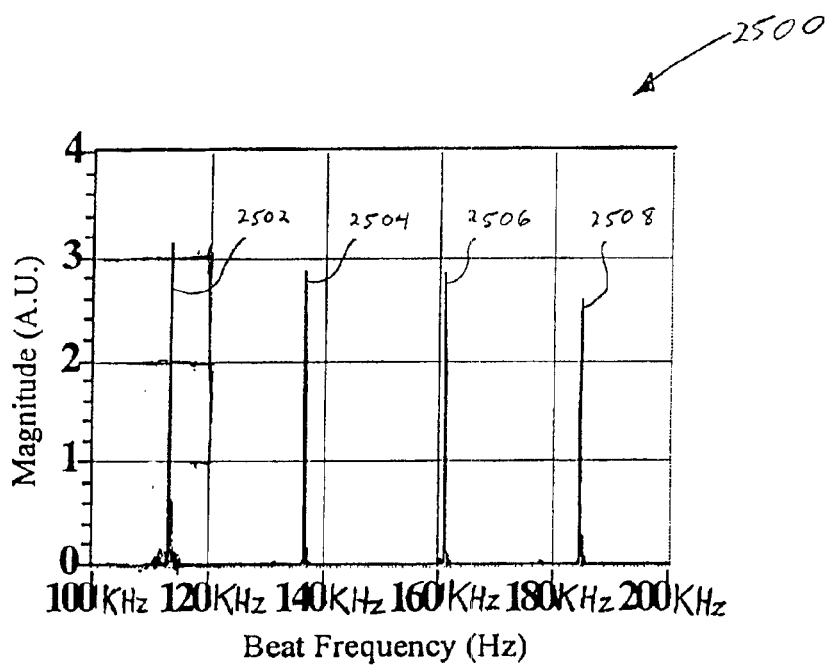
FIG. 25 is a Fourier transform of the beat frequencies derived from the optical network analyzer of FIG. 24 in accordance with one embodiment of the present invention.

With reference still to FIG. 24, upon reflection from mirror 2405 and composite optical system 2406, the optical signals are mixed and are incident upon optical detector 2408. The resulting mixed optical signal results in beat frequency proportional to the time delay between the two optical waves. Furthermore, the frequency of the beat signal indicates the location of the reflection relative to the reference, while the magnitude and phase of the beat frequency indicate the magnitude and phase of the reflection from composite optical system 2406. As an example, FIG. 25 is a graph 2500 of the Fourier transform of the beat signal generated by composite optical system 2406 using optical network analyzer 2400 both of FIG. 24. As shown in graph 2500, four beat frequencies 2502, 2504, 2506, and 2508 are detected as a result of the four fiber Bragg gratings 2406a, 2406b, 2406c, and 2406d comprising composite optical system 2406.

Figure 26:
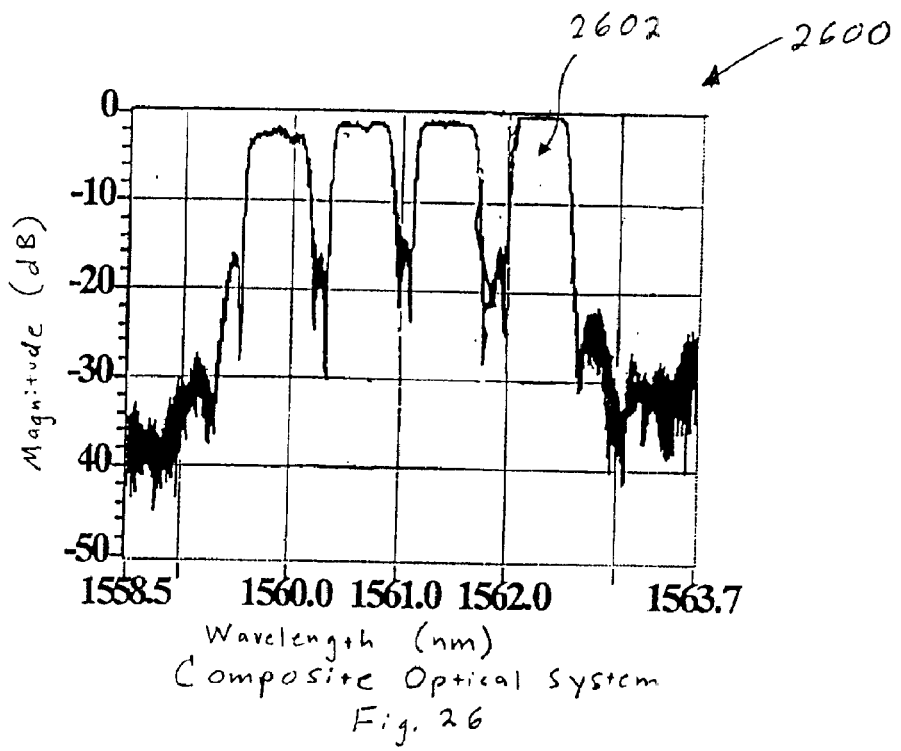
FIG. 26 is a graph of the amplitude response of a composite optical system.

Referring now to FIG. 26, a graph 2600 is shown of the amplitude response of composite optical system 2406. Although informative as to the amplitude response of composite optical system 2406, the optical characteristics of the individual sub-components 2406a, 2406b, 2406c, and 2406d are not individually distinguishable in graph 2600. As an example, although peak 2602 of graph 2600 may correspond primarily to sub-component 2406a, the amplitude response of sub-component 2406a in adjacent channels is not distinguishable. Similarly, the effects (e.g., cross-talk) of sub-components 2406b, 2406c, and 2406d on peak 2602 are also not distinguishable. For purposes of the following discussion, the term optical characteristics is meant to include but not be limited to: amplitude response, phase, group delay, reflectance, transmissivity, and the like.

Various embodiments of the present invention enable individual examination of the optical characteristics of a sub-component within a composite optical system in the following manner. The present invention separates the optical response of the sub-component from the optical response of the composite optical system. In one embodiment, the present invention applies a filter (e.g., a bandpass filter) with a center frequency at the beat frequency corresponding to the sub-component of interest. In one such embodiment, the filter has attenuation in the adjacent channels such that only the desired beat frequency passes through the filter while other frequencies are attenuated. As an example, assume that sub-component 2406a of composite optical system 2406 is the sub-component of interest. Further, assume that beat frequency 2502 of FIG. 25 having a frequency of approximately 115 KHz is the beat frequency corresponding to sub-component 2406a of FIG. 24. Then, in the present embodiment, a filter with a center frequency at approximately 115 KHz is applied to the heterodyne optical signal received at optical detector 2408. Additionally, in the present embodiment, the filter will have sufficient attenuation to ensure that beat frequencies 2504, 2506, and 2508 are filtered. In one approach employing software-based filtering, complete extinction of the unwanted frequencies can be achieved by setting those frequencies to zero in the frequency domain analysis.

Although certain embodiments of the present invention explicitly recite the use of a bandpass filter, the present invention is not limited solely to the use of such filtering methods. Rather, the present invention is well suited to the use of various filtering methods, software-based, hardware-based, and the like to separate the beat signal corresponding to the sub-component of interest from signals pertaining to the rest of the composite optical system. For example, the present invention is well suited to using phase-lock loop techniques to separate the phase of the sub-component of interest from the phase response pertaining to the rest of the composite optical system. As yet another example, the present invention is well suited to employing phase shifting techniques to separate sub-component responses from responses of respective composite optical systems. Furthermore, the present invention is well suited to utilizing down-conversion methods to separate the optical response the sub-component of interest from signals pertaining to the rest of the composite optical system. In one such approach, a local oscillator is used to down-convert the composite optical signal response. More specifically, the signal pertaining to the sub-component of interest is down-converted to the passband frequency an appropriate filter. In so doing, the optical response of the sub-component is effectively filtered from the optical response of the composite optical system.

Signal analysis is then performed on the un-attenuated signal pertaining to the sub-component of interest. In so doing, the present invention enables measuring of the optical characteristics of a particular sub-component within a composite optical system. Beneficially, the present embodiment enables readily determining the optical characteristics of a sub-component of a composite optical system without dismantling of the composite optical system. As a result, the present invention eliminates the complexity, time-consumption, and potential damage associated with dismantling and re-assembling a composite optical system.

In one embodiment of the present invention, after separating the beat signal corresponding to the sub-component of interest from signals pertaining to the rest of the composite optical system, the present invention determines the optical characteristics of the sub-component. More particularly, the present embodiment determines the optical characteristics of the sub-component by utilizing at least one portion of the optical response (e.g., the beat frequency) of the sub-component. Various methods for extracting the optical characteristics of the sub-component using a portion of the sub-component's optical response are described above in detail in conjunction with the description of FIGS. 1–23. Such methods include, for example, phase subtraction, derivative ratio (i.e. division), and clocking. Additionally, the present invention is well suited to using orthogonal filtering methods described above in detail in conjunction with the description of FIGS. 1–23 in order to determine the optical characteristics of the sub-component using a portion of the optical response of the sub-component. Such orthogonal filtering methods include, for example: (i) in-phase and quadrature filtering in the time domain utilizing convolution, (ii) in-phase and quadrature filtering in the frequency domain, (iii) single sided filtering, and (iv) all-pass filtering utilizing Hilbert transforms. Although such methods are recited herein, the present invention is well suited to the use of various other methods and systems for determining the optical characteristics of a sub-component.

Figure 27:
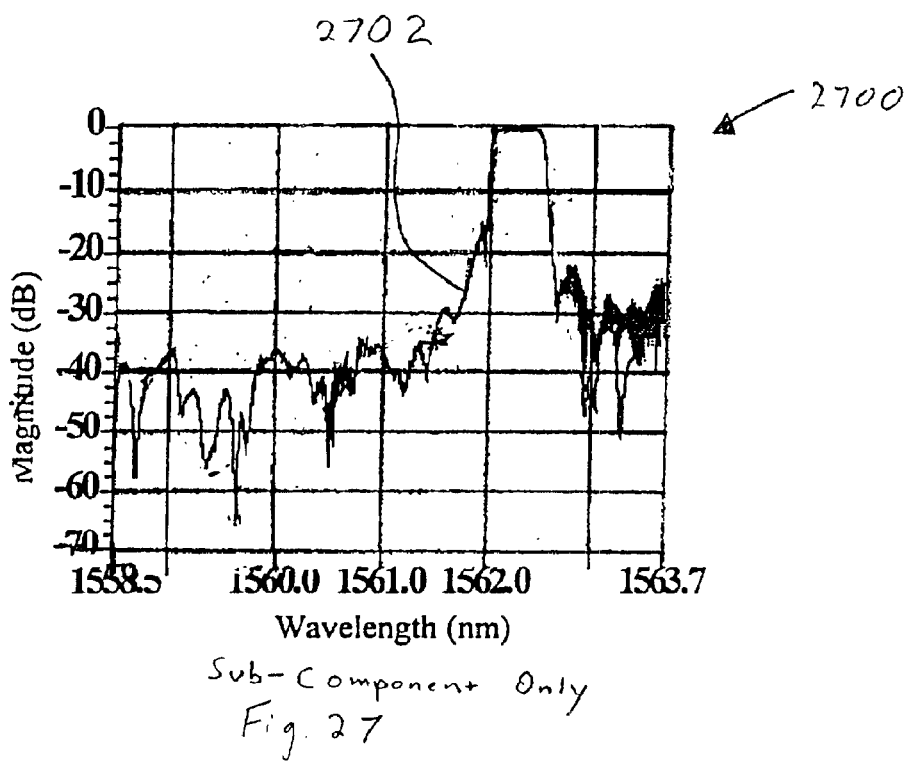
FIG. 27 is a graph of the amplitude response of a sub-component of a composite optical system in accordance with one embodiment of the present invention.

With reference now to FIG. 27, graph 2700 is shown of the amplitude response of individual sub-component 2406a. Unlike graph 2600 of composite optical system 2400, graph 2700 plots, along line 2702, the amplitude response of single sub-component 2406a of composite optical system 2406. That is, the present embodiment enables individually distinguishing the amplitude response of sub-component 2406a even when residing within a composite optical system. As a result, the precise behavior/response of this sub-component in adjacent channels is distinguishable in graph 2700. Also, the reflection from sub-components 2406b, 2406c, and 2406d no longer substantially affect the plotted amplitude response of sub-component 2406a. Also, the present discussion specifically recites separating an optical response of a single sub-component from the optical response of a composite optical system. It should be noted, however, that the present invention is also well suited to an embodiment in which the optical response of a subset of sub-components is separated from the composite optical signal. For example, referring again to FIG. 25, the present invention is also well suited to an embodiment in which beat frequencies 2502 and 2504 are filtered/separated from beat frequencies 2506 and 2508. In such an embodiment, a subset of the composite optical system (i.e. more than one sub-component but less than the entire composite optical system) can then be examined together in combination.

Figure 28:
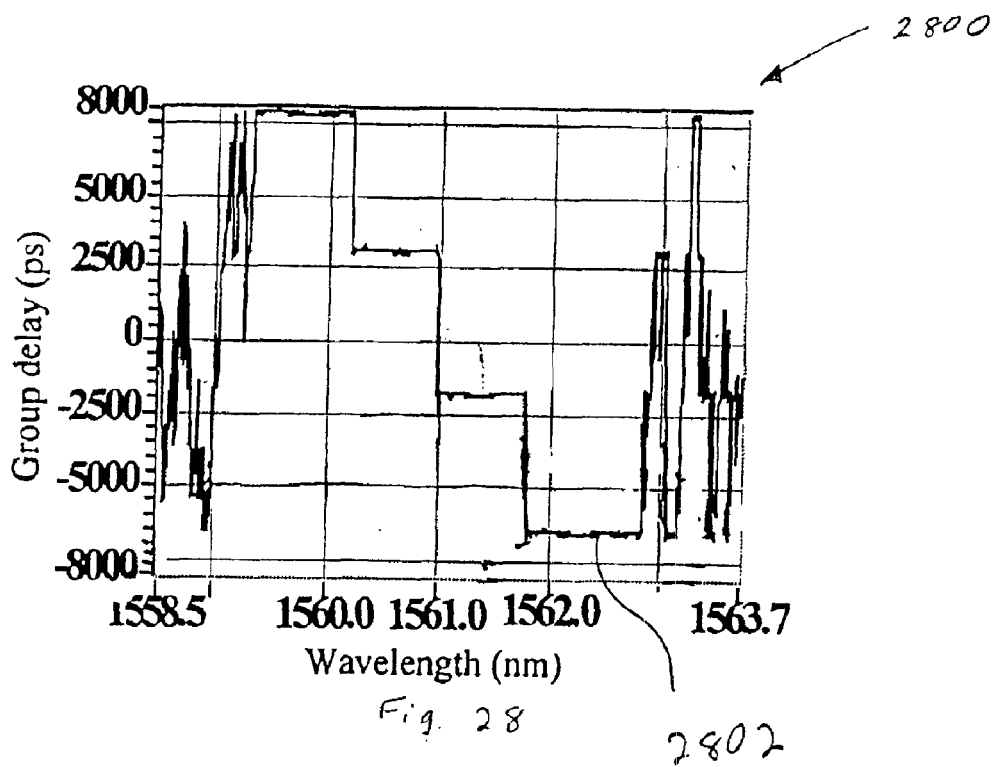
FIG. 28 is a graph of the group delay of a composite optical system.

With reference now to FIG. 28 a graph 2800 is shown of the group delay of composite optical system 2406. It will be understood that the group delay is derived from the phase of the optical signal reflected from composite optical system 2406. Although informative as to the group delay of composite optical system 2406, the optical characteristics of the individual sub-components 2406a, 2406b, 2406c, and 2406d are not individually distinguishable in graph 2800. As an example, although peak 2802 of graph 2800 may correspond primarily to sub-component 2406a, the group delay induced by sub-component 2406a in adjacent channels is not distinguishable. Similarly, the effects (e.g., cross-talk) of sub-components 2406b, 2406c, and 2406d on peak 2802 are also not distinguishable in adjacent channels.

Figure 29:
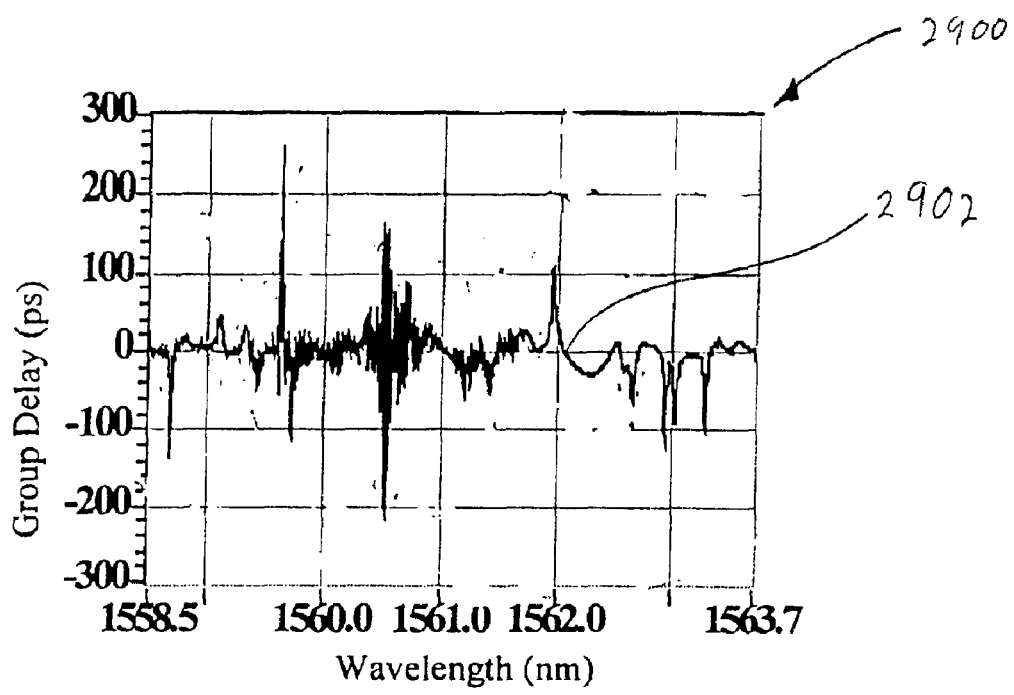
FIG. 29 is a graph of the group delay of a sub-component of a composite optical system in accordance with one embodiment of the present invention.

With reference now to FIG. 29, graph 2900 is shown of the group delay of individual sub-component 2406a. Unlike graph 2800 of composite optical system 2400, graph 2900 plots, along line 2902, the group delay of single sub-component 2406a of composite optical system 2406. That is, the present embodiment enables individually distinguishing the group delay of sub-component 2406a even when residing within a composite optical system. As a result, the precise behavior/response of sub-component in adjacent channels is distinguishable in graph 2900. Also, the effects (e.g., cross-talk) of sub-components 2406b, 2406c, and 2406d no longer substantially affect the plotted group delay of sub-component 2406a. As a result, the present invention enables measuring of the optical characteristics of a particular sub-component within a composite optical system. Hence, the present invention can be used, for example, to readily verify or correct manufacturer specified optical characteristics for a sub-component within a composite optical system. Thus, end-users are not solely dependent upon potentially incorrect manufacturer provided data.

Figure 30:
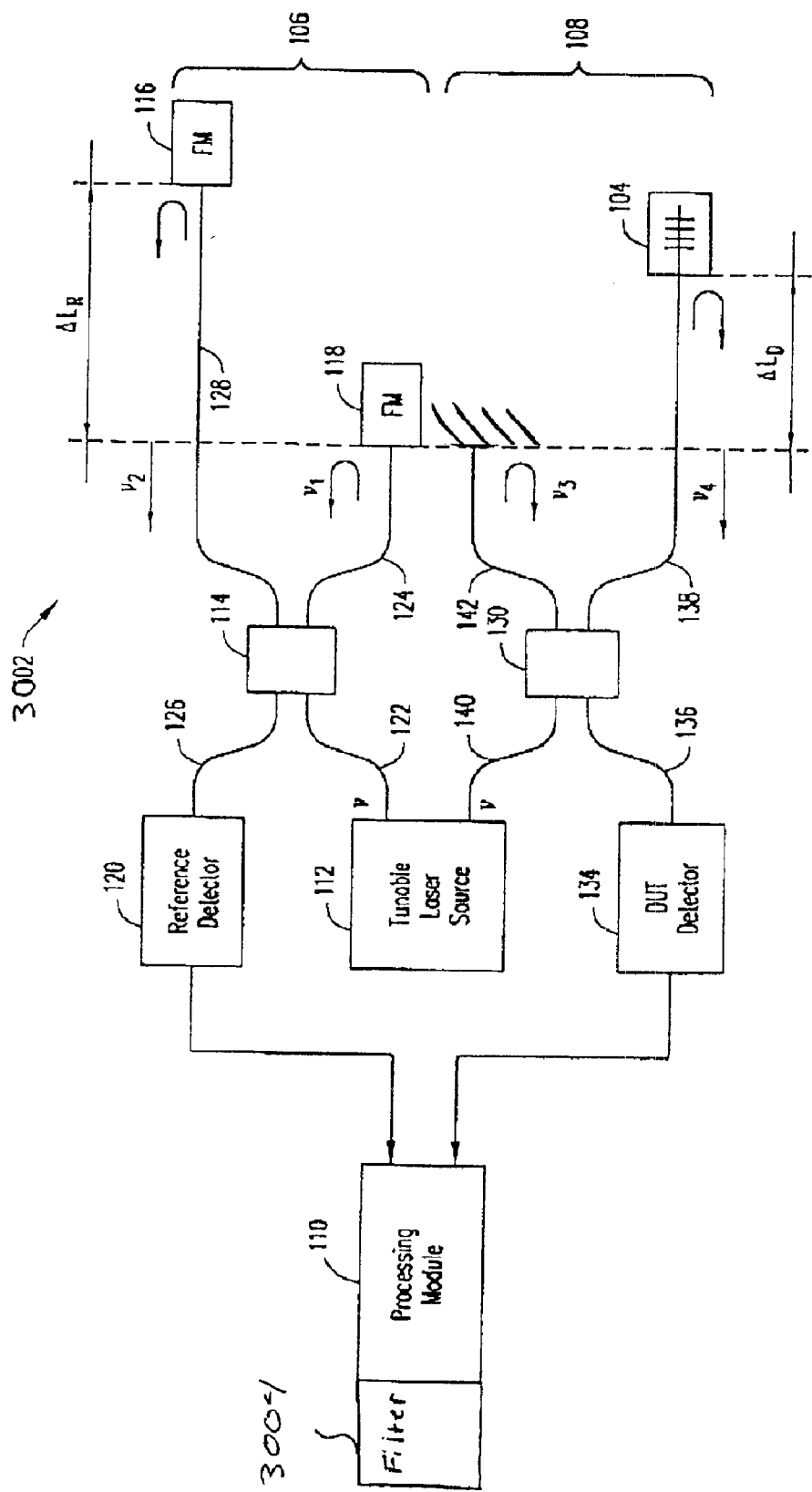
FIG. 30 is a block diagram of an optical network analyzer configured to perform reflectance measurements wherein the optical network analyzer includes a filter in accordance with embodiments of the present invention.

With reference now to FIG. 30, an optical network analyzer 3002 in accordance with one embodiment of the present invention is shown. Optical network analyzer 3002 contains the same features as optical network analyzer 102 of FIG. 1 and also includes a filter 3004. Filter 3004 is configured to separate an optical response of a sub-component from the optical response of a composite optical system in the manner and for the reasons stated above. Although such an optical network analyzer configuration is shown in the present embodiment, the present invention is well suited to use with various other configurations. That is, the present invention is not intended to be limited to any particular precise mechanical or software configuration. Hence, the present invention provides a method and system to readily determine the optical characteristics of a sub-component of a composite optical system. Furthermore, embodiments of the present invention are compatible with interferometric optical component analyzers employing continuously sweeping light sources.

Figure 31:
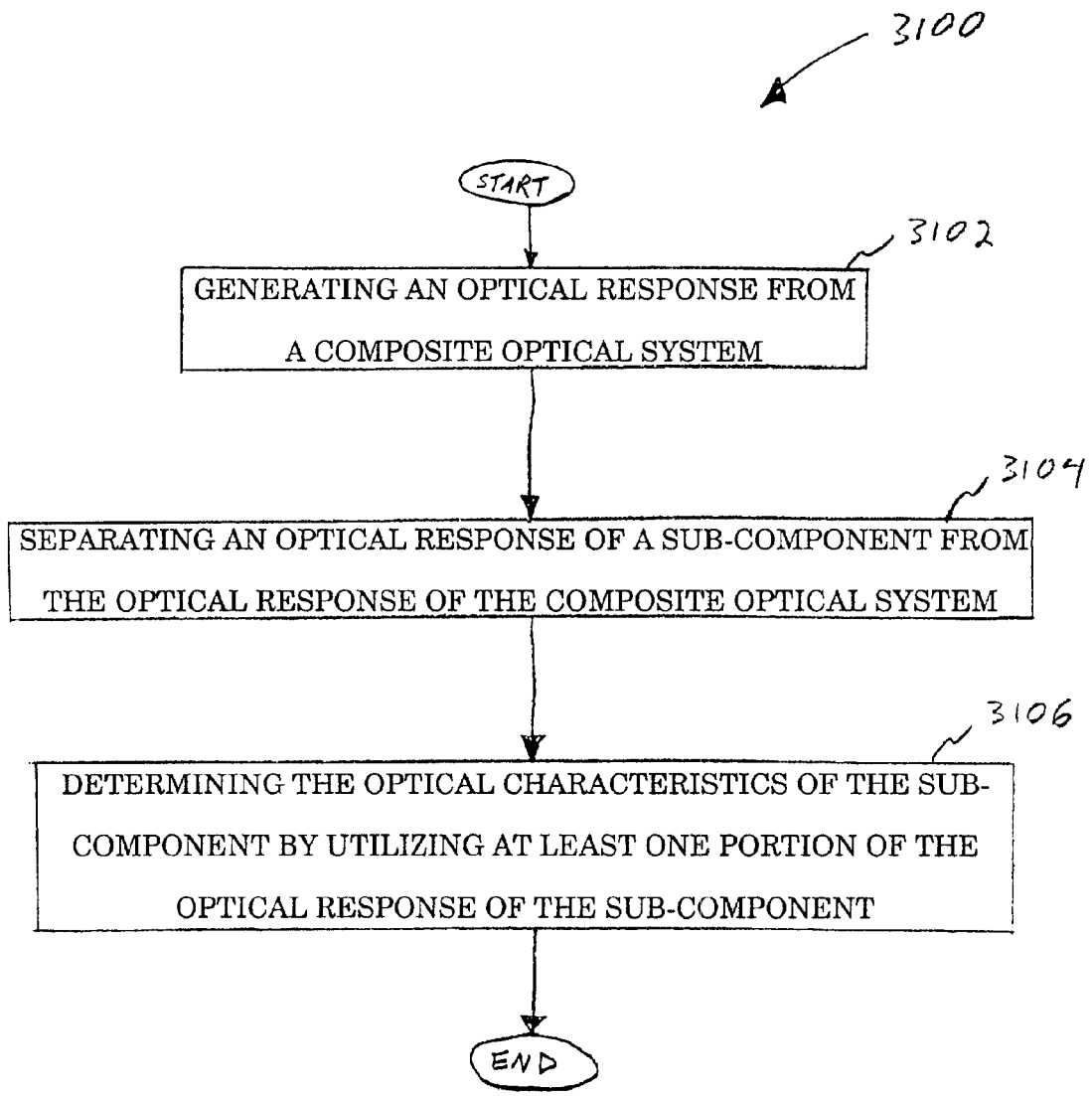
FIG. 31 is a flow chart of steps performed in accordance with one embodiment of the present invention.

With reference now to flow chart 3100 of FIG. 31, exemplary steps used by the various embodiments of present invention are illustrated. Flow chart 3100 includes processes of the present invention which, in one embodiment, are carried out by a processor under the control of computer-readable and computer-executable instructions. The computer-readable and computer-executable instructions reside, for example, in data storage features such as computer usable volatile memory, computer usable non-volatile memory, and/or a data storage device. In one embodiment, the computer-readable and computer-executable instructions are used to control or operate in conjunction with, for example, processing module 110 of FIG. 30.

With reference again to FIG. 31, steps performed in accordance with one embodiment of the present invention are shown. Although specific steps are disclosed in flow chart 3100 of FIG. 31, such steps are exemplary. That is, the present invention is well suited to performing various other steps or variations of the steps recited in FIG. 31. At step 3102, the present embodiment generates an optical response from a composite optical system. As described above, in one embodiment, the optical response is generated by providing an input optical signal having a time-varying frequency and then illuminating the composite optical system with the input optical signal. Moreover, in one embodiment the optical response is comprised of a heterodyne beat signal corresponding to the composite optical system. The present invention is, however, well suited to using various other methods and systems to generate the optical response from the composite optical system.

At step 3104, the present invention separates an optical response of the sub-component from the optical response of the composite optical system. As described above, one embodiment of the present invention uses a bandpass filter to separate from the plurality of heterodyne beat signals a heterodyne beat signal corresponding to the sub-component of interest. The present invention is, however, well suited to using various other methods to separate optical response of the sub-component from the optical response of the composite optical system.

Referring now to step 3106, the present embodiment then determines the optical characteristics of the sub-component by utilizing at least one portion of the optical response of the sub-component. More specifically, in one embodiment, the present invention uses at least a portion of the heterodyne beat signal corresponding to the sub-component of interest to determine the optical characteristics of the sub-component. Also, in one embodiment, the present invention employs techniques such as phase subtraction, (ii) derivative ratio (i.e., division), and (iii) clocking to determine the optical characteristics. Additionally, the present invention is well suited to using orthogonal filtering methods described above in detail in conjunction with the description of FIGS. 1–23 in order to determine the optical characteristics of the sub-component using a portion of the optical response of the sub-component. Such orthogonal filtering methods include, for example: (i) in-phase and quadrature filtering in the time domain utilizing convolution, (ii) in-phase and quadrature filtering in the frequency domain, (iii) single sided filtering, and (iv) all-pass filtering utilizing Hilbert transforms. Although such methods are recited herein, the present invention is well suited to the use of various other methods and systems for determining the optical characteristics of a sub-component. Additional optical characteristics which can be determined include, for example, amplitude response, phase, group delay, reflectance, transmissivity, and the like. Hence, in one embodiment, the present invention utilizes an amplitude portion of the optical response of the sub-component to determine the optical characteristics of the sub-component. In another embodiment, the present invention utilizes a phase portion of the response of the sub-component to determine the optical characteristics of the sub-component. In yet another embodiment, the present invention utilizes both a phase portion and an amplitude portion of the response of the sub-component to determine the optical characteristics of the sub-component.

Referring still to step 3106, in one embodiment, the present invention determines the amplitude and phase of the optical response of the sub-component by first detecting a reference phase of the input optical signal. Next, the present embodiment determines the optical characteristics of the sub-component by utilizing the amplitude and phase of the optical response of the sub-component and the reference phase of the input optical signal.

Figure 32:
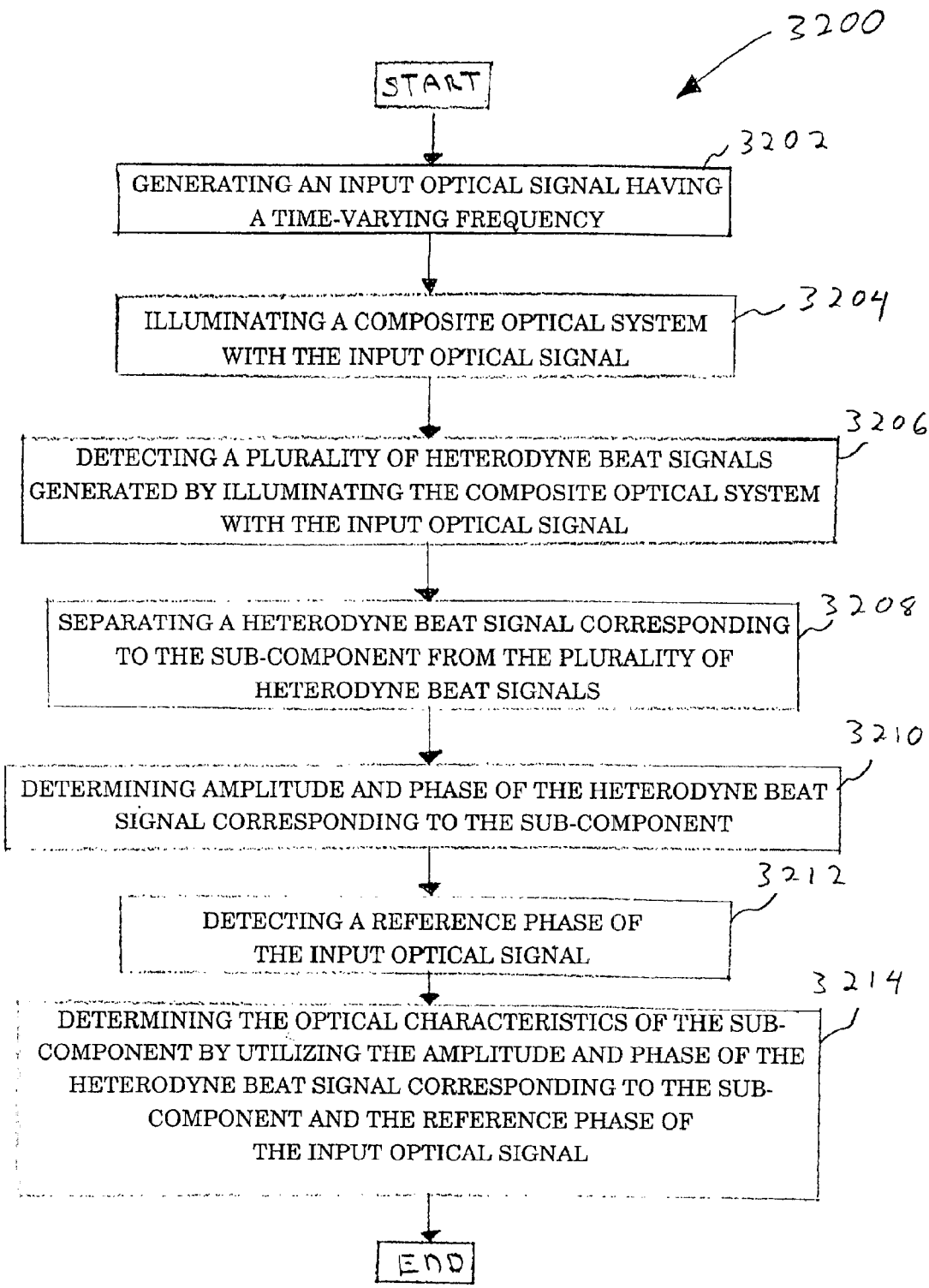
FIG. 32 is a flow chart of steps performed in accordance with another embodiment of the present invention.

With reference now to flow chart 3200 of FIG. 32, exemplary steps used by the various embodiments of present invention are illustrated. Flow chart 3200 includes processes of the present invention which, in one embodiment, are carried out by a processor under the control of computer-readable and computer-executable instructions. The computer-readable and computer-executable instructions reside, for example, in data storage features such as computer usable volatile memory, computer usable non-volatile memory, and/or a data storage device. In one embodiment, the computer-readable and computer-executable instructions are used to control or operate in conjunction with, for example, processing module 110 of FIG. 30.

With reference again to FIG. 32, steps performed in accordance with one embodiment of the present invention are shown. Although specific steps are disclosed in flow chart 3200 of FIG. 32, such steps are exemplary. That is, the present invention is well suited to performing various other steps or variations of the steps recited in FIG. 32. In the present embodiment, the present invention employs a method which is consistent with interferometric optical component analyzers employing continuously sweeping light sources. At step 3202 and 3204, the present embodiment generates an optical response by generating an input optical signal having a time-varying frequency and then illuminating the composite optical system with the input optical signal.

At step 3206, the present embodiment detects a plurality of heterodyne beat signals generated by illuminating the composite optical system with the input optical signal.

At step 3208, the present embodiment separates an optical response of the sub-component from the optical response of the composite optical system. Various methods for accomplishing this separation step are described above in detail.

At step 3210, the present embodiment determines amplitude and phase of the heterodyne beat signal corresponding to the sub-component. Various methods for accomplishing this separation step are described above in detail. These methods include for example, phase subtraction, (ii) derivative ratio (i.e., division), and (iii) clocking to determine the optical characteristics. Additionally, the present invention is well suited to using orthogonal filtering methods described above in detail in conjunction with the description of FIGS. 1–23 in order to determine the optical characteristics of the sub-component using a portion of the optical response of the sub-component. Such orthogonal filtering methods include, for example: (i) in-phase and quadrature filtering in the time domain utilizing convolution, (ii) in-phase and quadrature filtering in the frequency domain, (iii) single sided filtering, and (iv) all-pass filtering utilizing Hilbert transforms. Although such methods are recited herein, the present invention is well suited to the use of various other methods.

Referring now to step 3212, the present embodiment then detects a reference phase of the input optical signal. The detection is performed, for example, by detector 120 of FIG. 30.

With reference now to step 3214, the present embodiment then determines the optical characteristics of the sub-component by utilizing the amplitude and phase of the heterodyne beat signal corresponding to the sub-component of interest. Once again, such optical characteristics include, for example, reflectivity, transmissivity, and group delay.

Thus, the present invention provides a method and system to readily determine the optical characteristics of a sub-component of a composite optical system. The present invention further provides for a method and system which achieves the above accomplishment and which does not require dismantling of the composite optical system. The present invention also provides a method and system which achieves the above accomplishments and which can be used to verify or correct manufacturer specified optical characteristics for a sub-component within a composite optical system. The present invention further provides a method and system which achieves the above accomplishments and which is compatible with interferometric optical component analyzers employing continuously sweeping light sources.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for measuring optical characteristics of a sub-component within a composite optical system, said method comprising:

a) generating an optical response from said composite optical system, by mixing a reflection of an input optical signal off said composite optical system and another reflection of said input optical signal off a reference component;

b) separating an optical response of said sub-component from said optical response of said composite optical system; and c) determining said optical characteristics of said sub-component by utilizing at least one portion of said optical response of said sub-component.

2. The method as recited in claim 1 wherein step a) comprises generating said optical response from said composite optical system by:

providing said input optical signal having a time-varying frequency; and illuminating said composite optical system with said input optical signal.

3. The method as recited in claim 2 wherein step c) comprises determining amplitude and phase of said optical response of said sub-component;

detecting a reference phase of said input optical signal; and determining said optical characteristics of said sub-component by utilizing said amplitude and phase of said optical response of said sub-component and said reference phase of said input optical signal.

4. The method as recited in claim 1 wherein said optical response is comprised of a heterodyne beat signal corresponding to said sub-component of said composite optical system.

5. The method as recited in claim 4 wherein said step b) comprises using a bandpass filter to separate from a plurality of heterodyne beat signals said heterodyne beat signal corresponding to said sub-component.

6. The method as recited in claim 5 wherein step c) comprises utilizing orthogonal filters to determine amplitude and phase of said heterodyne beat signal corresponding to said sub-component.

7. The method as recited in claim 1 wherein said at least one portion of said optical response of said sub-component is an amplitude portion of said optical response of said sub-component.

8. The method as recited in claim 1 wherein said at least one portion of said optical response of said sub-component is a phase portion of said optical response of said sub-component.

9. The method as recited in claim 1 wherein said at least one portion of said optical response of said sub-component is an amplitude portion and a phase portion of said optical response of said sub-component.

10. The method as recited in claim 1 wherein step c) wherein said optical characteristics of said sub-component are selected from the group comprising reflectivity, transmissivity, and group delay.

11. A system for measuring optical characteristics of a sub-component of a composite optical system in response to an input light signal, said system comprising:
   an optical detector optically coupled to said composite optical system to receive said optical response of said composite optical system, wherein said optical response is generated by mixing a reflection of said input light signal off said composite optical system and another reflection of said input light signal off a reference component;
   a filter coupled to said optical detector, said filter for separating an optical response of said sub-component from said optical response of said composite optical system; and
   a processing unit coupled to said filter, said processing unit for determining said optical characteristics of said sub-component by utilizing at least one portion of said optical response of said sub-component.

12. The system of claim 11 wherein said input light signal is generated by a light source which generates an input light signal having a time-varying frequency.

13. The system of claim 11 wherein said at least one portion of said optical response of said sub-component is an amplitude portion of said optical response of said sub-component.

14. The system of claim 11 wherein said at least one portion of said optical response of said sub-component is a phase portion of said optical response of said sub-component.

15. The system of claim 11 wherein said at least one portion of said optical response of said sub-component is an amplitude portion and a phase portion of said optical response of said sub-component.

16. The system of claim 11 wherein said optical response of said composite optical system is comprised of a plurality of heterodyne beat signals.

17. The system of claim 16 wherein said filter is configured to separate from said plurality of heterodyne beat signals a heterodyne beat signal corresponding to said sub-component.

18. The system of claim 17 wherein said processing unit comprises orthogonal filters for determining amplitude and phase of said heterodyne beat signal corresponding to said sub-component.

19. The system of claim 11 wherein said optical characteristics of said sub-component are selected from the group comprising reflectivity, transmissivity, and group delay.

20. The system of claim 11 further comprising:
   another optical detector adapted to be optically coupled to said input light signal, said another optical detector configured to detect a reference phase of said input light signal; and
   said optical detector configured to detect a plurality of heterodyne beat signals comprising said optical response.

* * * * *